United States Patent [19]
Kawakami et al.

[11] Patent Number: 5,947,225
[45] Date of Patent: Sep. 7, 1999

[54] AUTOMATIC VEHICLE

[75] Inventors: Yuichi Kawakami, Itami; Nobukazu Kawagoe, Toyonaka, both of Japan

[73] Assignee: Minolta Co., Ltd., Osaka, Japan

[21] Appl. No.: 08/631,014

[22] Filed: Apr. 12, 1996

[30] Foreign Application Priority Data

| Apr. 14, 1995 | [JP] | Japan | 7-089679 |
| Apr. 14, 1995 | [JP] | Japan | 7-089680 |
| Apr. 14, 1995 | [JP] | Japan | 7-089681 |
| Apr. 14, 1995 | [JP] | Japan | 7-089682 |
| Apr. 14, 1995 | [JP] | Japan | 7-089683 |

[51] Int. Cl.$^6$ .................................................. B60D 1/28
[52] U.S. Cl. ...................... 180/271; 180/167; 180/274; 180/280
[58] Field of Search .................. 180/274, 280, 180/271, 167, 169, 168

[56] References Cited

U.S. PATENT DOCUMENTS

| 5,056,612 | 10/1991 | Roumagnac | 180/167 |
| 5,187,663 | 2/1993 | Kamimura et al. | 180/167 |
| 5,279,672 | 1/1994 | Betker et al. | 180/169 |

FOREIGN PATENT DOCUMENTS

| 3-160507 | 7/1991 | Japan . |
| 4-84207 | 3/1992 | Japan . |
| 4-260905 | 9/1992 | Japan . |
| 5-17703 | 3/1993 | Japan . |

Primary Examiner—Eric Culbreth
Attorney, Agent, or Firm—Burns, Doane, Swecker & Mathis, LLP

[57] ABSTRACT

A vehicle has a sensor for detecting a first distance to a first object and a second distance to a second object located on the other side of the first object. The vehicle travels along a path between the first object and the second object based on the detected first and second distances.

A vehicle has a sensor for detecting a distance to an object and a working unit which is movably connected with a main body. The working unit is moved based on the detected distance to the object.

17 Claims, 25 Drawing Sheets

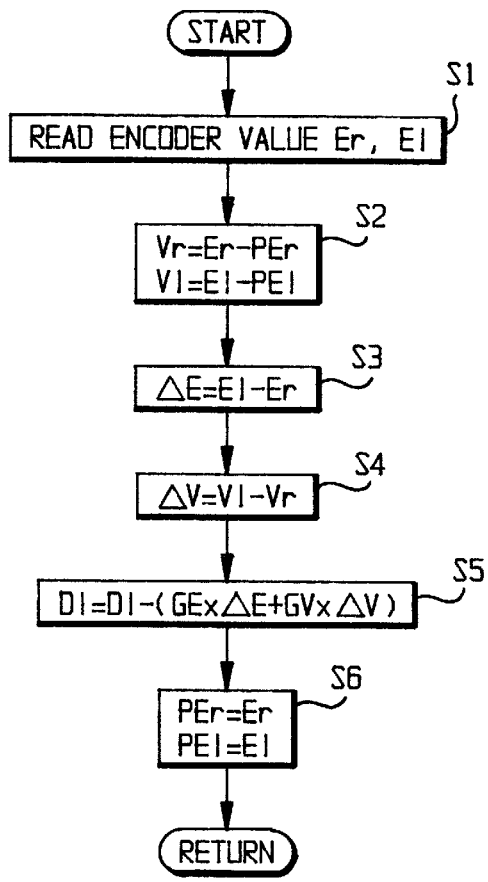
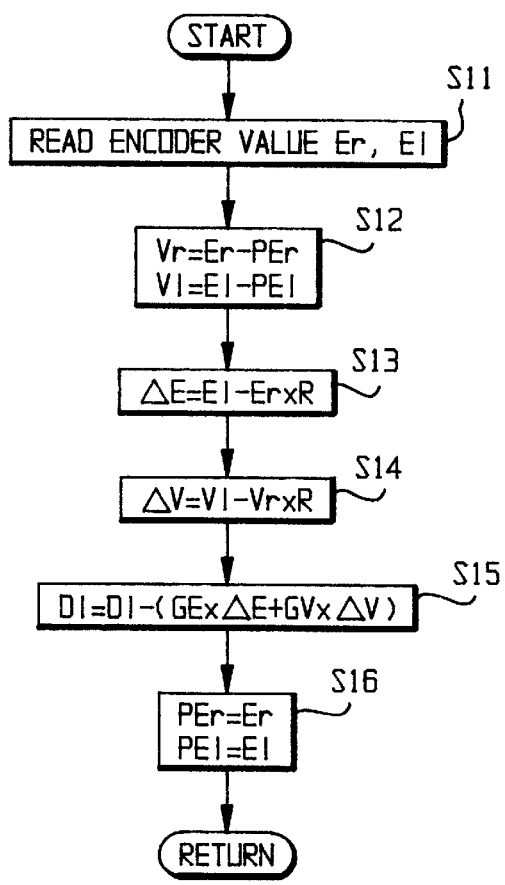
FIG. 7
FIG. 8
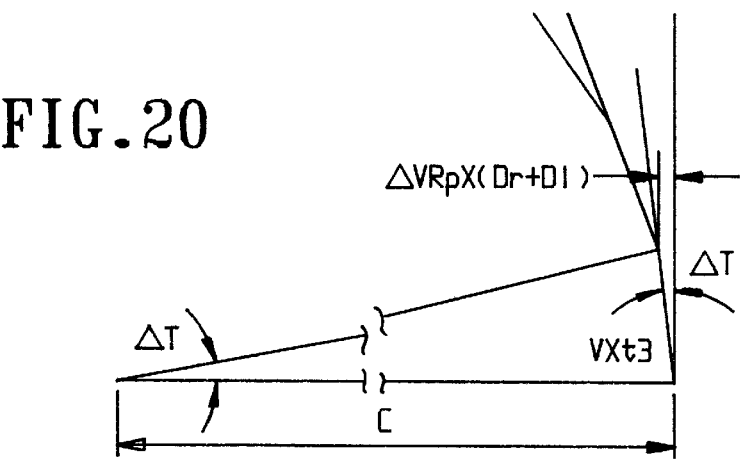
FIG. 20

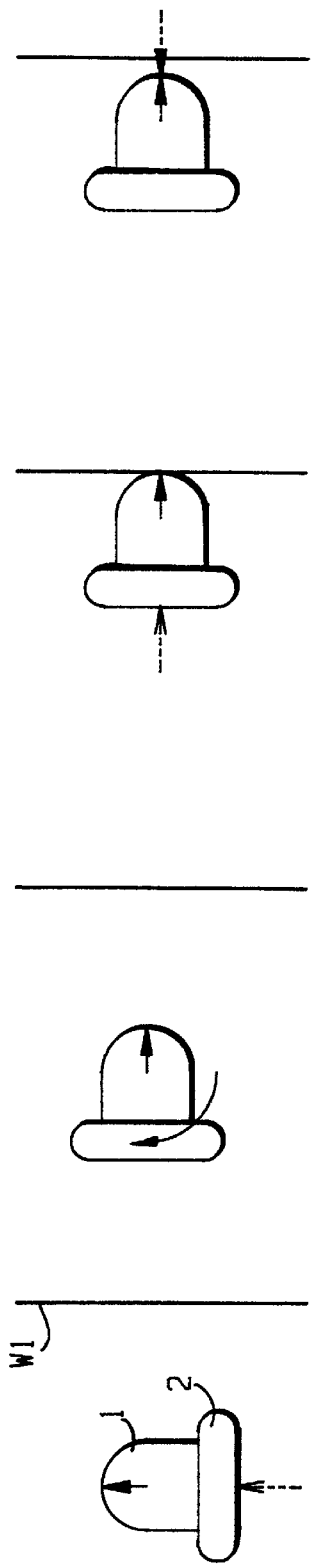
FIG. 13(a)  FIG. 13(b)  FIG. 13(c)  FIG. 13(d)
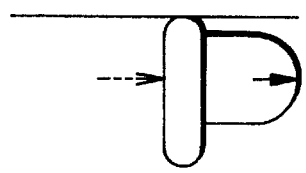
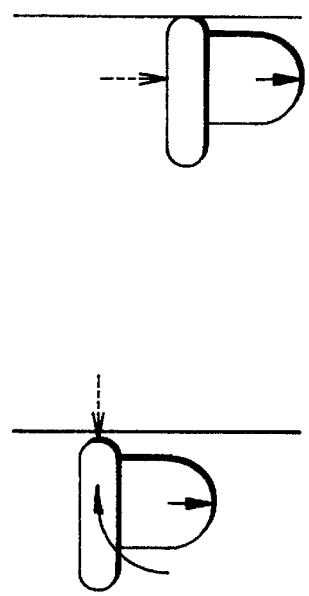
FIG. 13(e)  FIG. 13(f)

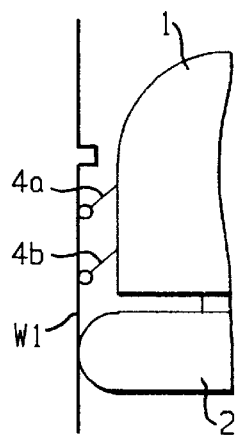
FIG. 39( a )
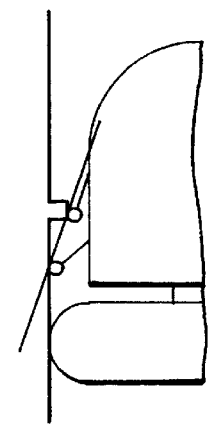
FIG. 39( b )
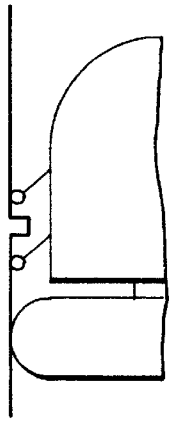
FIG. 39( c )
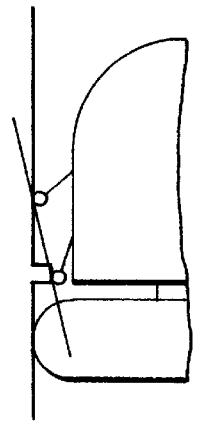
FIG. 39( d )
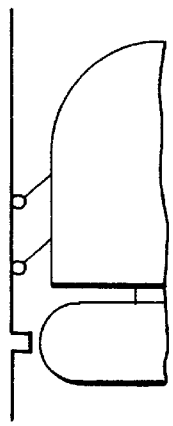
FIG. 39( e )
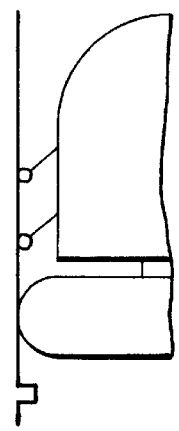
FIG. 39( f )

AUTOMATIC VEHICLE

BACKGROUND OF THE INVENTION

1. Field of the Invention

The present invention pertains to an automatic vehicle, and more particularly, to an automatic vehicle that can move along a target object.

2. Description of the Related Art

Various vehicles that perform certain work such as the cleaning and transportation of goods while moving along a target object such as a wall have been proposed as automatic vehicles that automatically move while detecting obstacles around them.

For example, Japanese Laid Open Patent Hei 4-84207 discloses an automatic vehicle that moves along the contour of the wall on one side.

Japanese Laid Open Patent Hei 3-160507 discloses an automatic vehicle equipped with distance measuring sensors placed on either side, one sensor in front of the other, which obtains its own position and orientation from the distance between itself and the wall as detected by the front and back distance measuring sensors, and thereby moves along the contour of the wall.

Japanese Laid Open Patent Hei 5-17703 discloses an automatic vehicle that measures the distance between itself and a reference wall, and is controlled such that it moves along a predetermined travel route. This automatic vehicle has two pairs of distance measuring sensors: one pair at one side of the vehicle and one pair at the center of the vehicle. The distance measuring sensors at the center of the vehicle perform close range distance measurement, and the distance measuring sensors at the side of the vehicle perform longer range distance measurement.

Japanese Laid Open Patent Hei 4-260905 discloses a model in which a contact wall detecting switch is placed at the tip of a working arm and the position of the working arm is adjusted such that this wall detecting switch is in contact with the wall at all times in order to ensure that the work is performed while the arm is in close contact with the wall.

Also disclosed is an automatic vehicle that can move straight ahead without being influenced by concavities on the wall surface, by virtue of placing members that indicate the concavities inside the concavities and making the vehicle move straight ahead based on said members.

However, pertaining to the automatic vehicle of Japanese Laid Open Patent Hei 4-84207, since distance measurement is performed to the wall on one side only, where the automatic vehicle is not parallel to the wall, it cannot move accurately along the contour of the wall.

With regard to the automatic vehicle of Japanese Laid Open Patent Hei 3-160507, where the automatic vehicle itself is small and is short in length, the front and rear distance measuring sensors cannot be placed at a sufficient distance from each other, and as a result the position and orientation of the automatic vehicle cannot be measured with high accuracy.

In the automatic vehicle disclosed in Japanese Laid Open Patent Hei 5-17703, the distance measuring sensors for longer range measurement are located at the center of the vehicle at a distance from the other pair, and consequently the automatic vehicle needs to have a certain minimum width and cannot be made small.

In regard to Japanese Laid Open Patent Hei 4-260905, because the wall detecting switch is placed on the working arm, where there is a protrusion on the wall, the working arm may get stuck, preventing the movement of the vehicle along the contour of the wall.

On the other hand, when using the model that requires the mounting of members that indicate concavities in the surface of the wall, said members need to be mounted in advance in accordance with the changes in the wall surface, the target object. Therefore, it is not possible for the automatic vehicle of this type to automatically move along the contour of a target object of all types of configuration.

SUMMARY OF THE INVENTION

The object of the present invention is to provide an automatic vehicle capable of accurate automatic movement along a target object at all times.

Another object of the present invention is to provide an automatic vehicle capable of detecting the existence/absence of a target object using contact sensors.

Yet another object of the present invention is to provide an automatic vehicle that may be made compact.

Yet another object of the present invention is to provide an automatic vehicle capable of moving along a target object in a stable manner at all times without having its working member becoming stuck on the target object regardless of the unevenness of the surface of the target object.

Yet another object of the present invention is to provide an automatic vehicle capable of automatically moving in an appropriate manner without being influenced by the changes in the target object's configuration.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 7 is a flow chart to explain a straight ahead control method.

FIG. 8 is a flow chart to explain a turn control method.

FIG. 13 is a drawing to explain a U-turn toward a position next to the wall.

FIG. 20 is a drawing to explain the locus of movement when the automatic vehicle is making a turn.

FIG. 39 is a drawing to explain an example of operation of the working arm using the control shown in FIG. 38.

DETAILED DESCRIPTION OF THE PREFERRED EMBODIMENTS (1) Entire construction of the automatic vehicle The automatic vehicle of one embodiment of the present invention is explained below with reference to the drawings. FIG. 1 is a perspective view showing the entire construction of the automatic vehicle of one embodiment of the present invention.

With reference to FIGS. 1 and 2, the automatic vehicle includes working main unit 1, working arm 2 and drive unit 3. Working main unit 1 is mounted on top of drive unit 3 such that it can rotate around the same axis as the rotational axis of drive unit 3, as indicated by an arrow. Working arm 2 is mounted at the back of working main unit 1 such that it can slide laterally as indicated by an arrow.

Automatic vehicles of the type of this embodiment are used for various purposes. As one example, an automatic vehicle used for cleaning and waxing will be explained in detail in the following embodiment. FIG. 3 shows the entire construction of the cleaning and waxing automatic vehicle in which the present invention is applied.

With reference to FIG. 3, working main unit 1 includes tank 11, hose 12, pump 13, slide mechanism 14, slide mechanism motor 15, controller 16 and contact sensors 17. Working arm 2 includes contact sensors 17.

Figure 1:
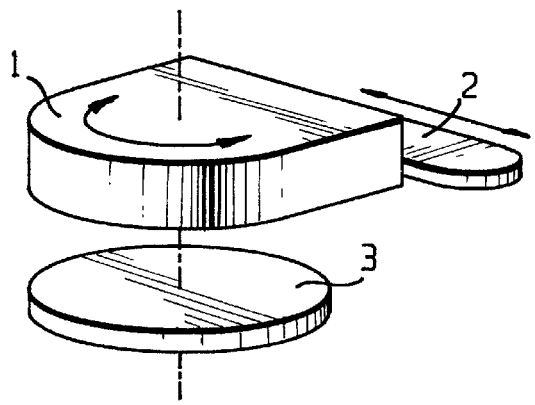
FIG. 1 is a perspective view showing the entire construction of the automatic vehicle of the embodiment.
Figure 2:
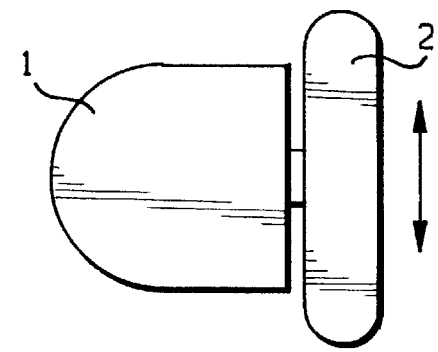
FIG. 2 is a plan view showing the entire construction of the automatic vehicle shown in FIG. 1.

Detergent (or wax) is stored in tank 11. The detergent stored in tank 11 is led to working arm 2 by means of pump 13 via hose 12. Working arm 2 is held by slide mechanism 14 such that it can move laterally facing working main unit 1. Working arm 2 is driven laterally by motor 15 via slide mechanism 14. Controller 16 controls the operations of pump 13, slide mechanism motor 15 and brushes 21 of working arm 2 (see FIG. 4). Contact sensors 17 to detect obstacles are located around the outer surface of working main unit 1 and working arm 2.

Non-contact sensors 18a and 18b, which are distance measuring sensors, are located on the left and right sides of working main unit 1 facing the direction of forward movement of the automatic vehicle. Contact sensors 4a, 4b, 4c and 4d, which are spring touch sensors, are located on the left and right sides of working main unit 1 facing the direction of forward movement of the automatic vehicle, one in front of another on either side. Non-contact sensors 18a and 18b and contact sensors 4a, 4b, 4c and 4d are described in detail below.

Figure 3:
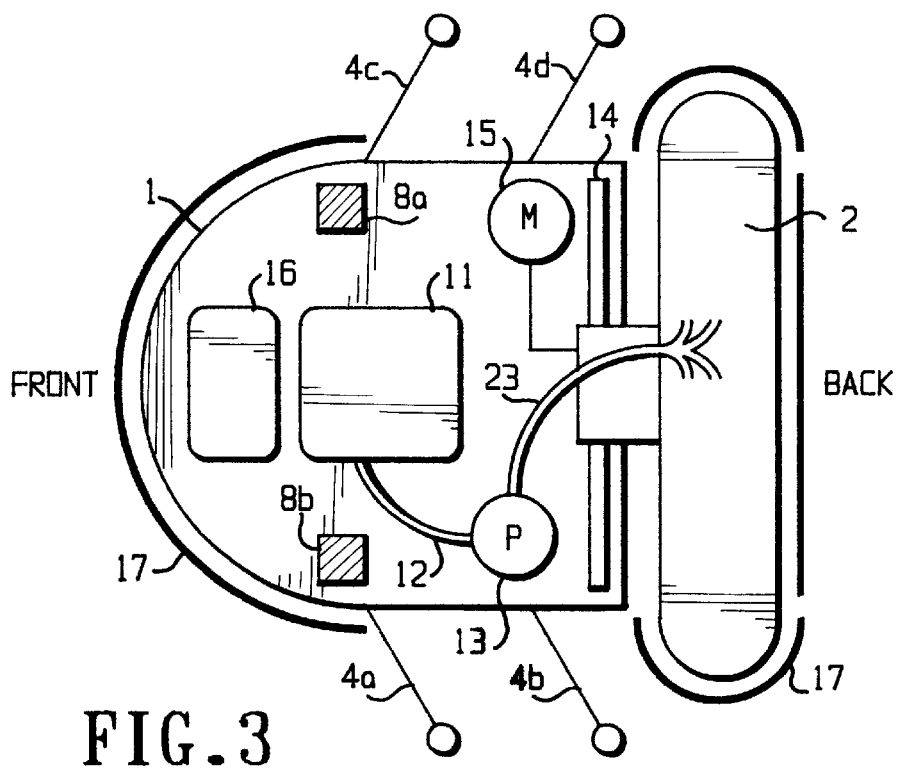
FIG. 3 shows the entire construction of an automatic vehicle used for cleaning and waxing purposes.
Figure 4:
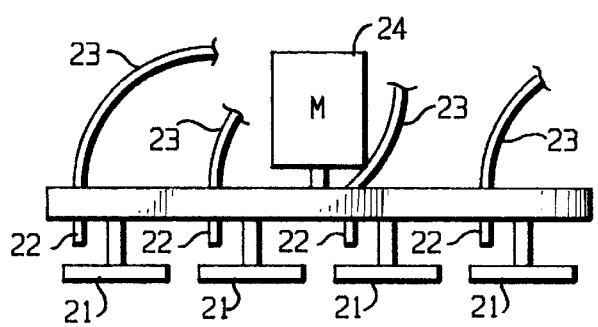
FIG. 4 is a side elevation showing the construction of the working arm shown in FIG. 3.
Figure 5:
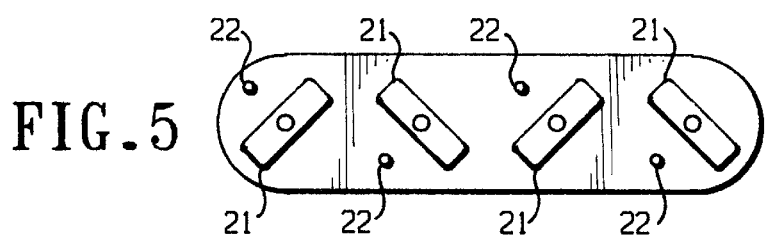
FIG. 5 is a bottom view showing the construction of the working arm shown in FIG. 3.

Working arm 2 shown in FIG. 3 will now be explained in detail. FIGS. 4 and 5 are a side elevation and a bottom view, respectively, showing the construction of the working arm shown in FIG. 3. With reference to FIGS. 4 and 5, working arm 2 includes brushes 21, nozzle 22, hose 23 and brush driving motor 24.

Four brushes 21 are rotatably attached to the bottom of working arm 2. Nozzle 22, to spray the detergent pushed out by pump 12 via hose 23 that is separated into four sections, is located near each brush 21. Four brushes 21 are connected to the rotational shaft of brush driving motor 24 by means of a connecting mechanism not shown in the drawings, and are driven to rotate by brush driving motor 24. In order to allow four brushes 21 to clean and wax a large area, the working width of the four brushes 21 is wider than the width of working main unit 1.

Figure 6:
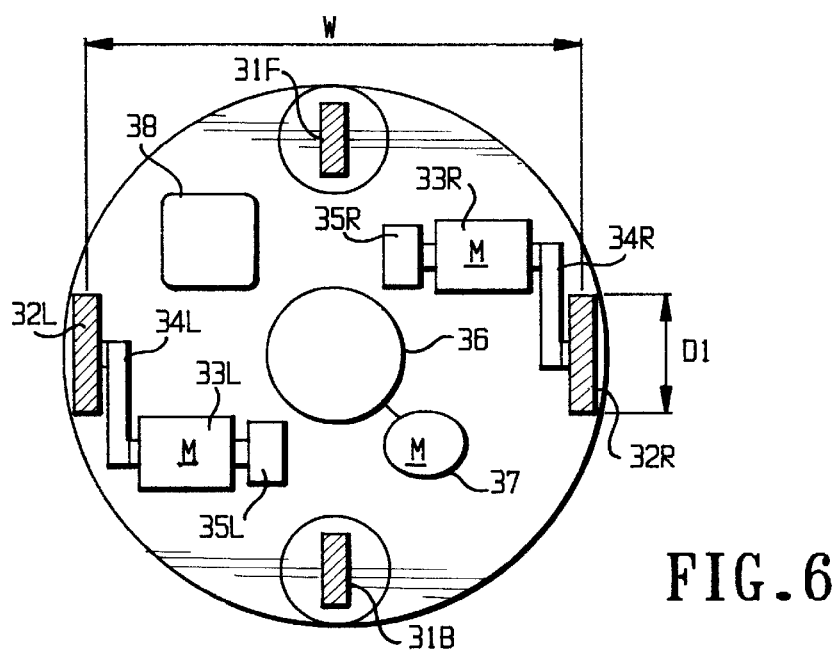
FIG. 6 shows the construction of the drive unit shown in FIG. 1.

Drive unit 3 shown in FIG. 1 will now be explained in detail. FIG. 6 shows the construction of the drive unit shown in FIG. 1.

With reference to FIG. 6, drive unit 3 includes driven wheels 31F and 31B, drive wheels 32R and 32L, drive wheel motors 33R and 33L, connecting mechanisms 34R and 34L, encoders 35R and 35L, rotary support mechanism 36, rotation drive motor 37 and controller 38.

Driven wheel 31F is mounted in front of drive unit 3 such that it can rotate in any direction. Driven wheel 31B is mounted in the back of drive unit 3 in the same way. Drive wheel 32R is mounted to the right of drive unit 3. The rotation of drive wheel motor 33R is transmitted to drive wheel 32R via connecting mechanism 34R. Encoder 35R is located on the other end of the drive shaft of drive wheel motor 33R such that the amount of rotation and rotation speed of drive wheel motor 33R may be detected. It is also possible to calculate and output the traveled distance from the amount of rotation detected as the output of encoder 35R. Drive wheel 32L, drive wheel motor 33L, connecting mechanism 34L and encoder 35L are similarly located to the left of drive unit 3. Rotary support mechanism 36 that rotatably supports working main unit 1 is located in the center of drive unit 3, and rotation drive motor 37 to rotate working main unit 1 via rotary support mechanism 36 is located next to said rotary support mechanism. Drive unit 3 also has controller 38 that controls the operations of drive wheel motors 33R and 33L as well as rotation drive motor 37. The distance between right and left drive wheels 32R and 32L is W. The diameter of drive wheels 32R and 32L is DI.

Figure 44:
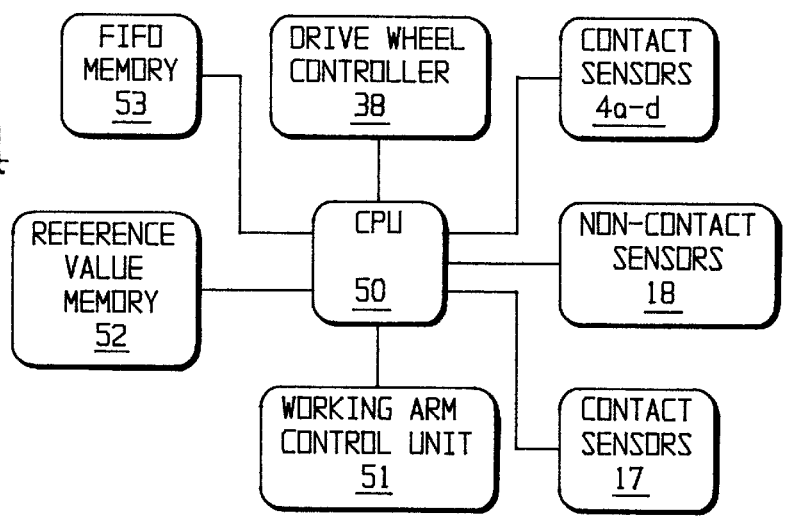
FIG. 44 is a block diagram showing the construction of the automatic vehicle of this embodiment.

FIG. 44 is a block diagram showing the construction of the automatic vehicle of this embodiment. The automatic vehicle is constructed around CPU 50. Connected to CPU 50 are non-contact sensors 18, contact sensors 4a–d, contact sensors 17, drive wheel controller 38, working arm control unit 51, reference value memory 52 and FIFO (first-in first-out) memory 53. The details of these members and the manner in which CPU 50 performs control are described below.

(2) Automatic vehicle drive control

The drive control pertaining to the automatic vehicle constructed as described above will now be explained. Five drive control methods are available: straight ahead control, turn control, first spin turn control, second spin turn control and third spin turn control. Each of the control methods are explained below. The control methods described below are carried out by controlling drive wheel motors 33R and 33L and rotation drive motor 37 through programs stored in controller 38 in advance.

Straight ahead control will be explained first. For the automatic vehicle to move straight ahead, it is necessary that right and left drive wheels 32R and 32L be controlled such that they rotate the same amount at all times after they are started to be driven. This can be achieved by controlling the rotation speeds of right and left drive wheels 32R and 32L. However, in order to further ensure that the amount of rotation of right drive wheel 32R matches that of left drive wheel 32L so that the automatic vehicle moves straight ahead with high accuracy, straight ahead control is executed using the method shown below.

Specifically, one of the drive wheels is deemed the reference wheel, and this reference wheel is controlled such that it rotates at a target speed. The other drive wheel (controlled wheel) is then controlled such that it rotates the same amount and at the same speed as the reference drive wheel. Here, DC motors are used as drive wheel motors 33R and 33L, and the electric currents supplied to the motors are increased or decreased by changing the period of time in which the electric currents are supplied to the motors (duty ratio) via PWM (pulse width modulation) for the purpose of said control.

The straight ahead control method where left drive wheel 32L is the controlled wheel and right drive wheel 32R is the reference wheel using the control method described above is explained below. FIG. 7 is a flow chart to explain said straight ahead control method. In the explanation below, pulses output from encoders 35R and 35L are counted by counters (omitted in the drawings) while the automatic vehicle is moving, and the count values from these counters are called encoder values, the encoder value for right drive wheel 32R being Er and the encoder value for left drive wheel 32L being El. Straight ahead control shown below is repeated at prescribed intervals t1. The amount of change in the encoder value during prescribed interval t1 is called the speed of the drive wheel, the speed for right drive wheel 32R being Vr and the speed for left drive wheel 32L being Vl. The PWM control amounts (duty ratios) to control the electric currents to be sent to right and left drive wheel motors 33R and 33L are Dr and Dl, respectively. When straight ahead control starts, right and left encoder values Er and El are reset, after which the control routine explained below is executed at prescribed intervals t1.

First, in step S1, right and left encoder values Er and El are read. Right and left drive wheel speeds Vr and Vl are then obtained. Specifically, right and left speeds Vr and Vl are obtained by subtracting the encoder values PEr and PEl obtained at the end of the previous prescribed interval t1 from encoder values Er and El read in step S1, respectively.

Then, in step S3, differential $\Delta E$ between encoder value El for the controlled wheel and encoder value Er for the reference wheel is obtained. In step S4, differential $\Delta V$ between speed Vl for the controlled wheel and speed Vr for the reference wheel is obtained.

In step S5, the amounts obtained by multiplying encoder value differential $\Delta E$ obtained in step S3 by gain GE and by multiplying speed differential $\Delta V$ obtained in step S4 by gain GV are subtracted from current duty ratio Dl for the controlled wheel. The value obtained from said subtraction is then deemed new duty ratio Dl for the controlled wheel. Current encoder values Er and El are then saved as encoder values PEr and PEl, respectively, obtained at the end of the previous prescribed interval t1. By controlling duty ratio Dl for controlled wheel 32L in accordance with the sequence described above, controlled wheel 32L is controlled such that its rotation speed and amount of rotation will be the same as those for reference wheel 32R.

Turn control will now be explained. Turn control is used to ensure a certain ratio between the speeds of right and left drive wheels 32R and 32L, in order for the automatic vehicle to turn. Specifically, the automatic vehicle is made to turn toward the reference wheel by controlling the speed and amount of rotation of controlled wheel 32L so that it is 10% higher than the speed and amount of reference wheel 32R, while the automatic vehicle is made to turn toward the controlled wheel by controlling the speed and amount of rotation of controlled wheel 32L so that it is 10% lower than the speed and amount of reference wheel 32R. Turning radius C is calculated based on speed ratio R and distance W between the right and left wheels using the following equation.

$$C = R \times W/(R-1) \qquad (1)$$

Therefore, where left drive wheel 32L is the reference wheel, the automatic vehicle turns to the left if R>1, while it turns to the right if R<1. The turning radius is also determined by the value of speed ratio R. Where C>0, the value of C indicates the turning radius when the automatic vehicle turns to the left, while where C<0, the value of C indicates the turning radius when it turns to the right. Where the automatic vehicle moves straight ahead, turning radius C becomes infinite. This means that straight ahead control explained above is a special case of turn control. In other words, where speed ratio R is 1 in turn control, that means that the automatic vehicle is moving straight ahead.

FIG. 8 is a flow chart to explain the turn control method described above. The turn control method is similar to the straight ahead control method in principle.

First, in steps S11 and S12, processes identical to those in steps S1 and S2 shown in FIG. 7 take place. Then, in step S13, differential $\Delta E$ is obtained by subtracting a value obtained by multiplying encoder value Er of reference wheel 32R by speed ratio R from encoder value El of controlled wheel 32L.

In step S14, differential $\Delta V$ is obtained by subtracting from controlled wheel speed Vl a value obtained by multiplying reference wheel speed Vr by speed ratio R. In steps S15 and S16, processes identical to those in steps S5 and S6 shown in FIG. 7 take place.

First spin turn control will now be explained. First spin turn control is used to spin-turn drive unit 3. In order to spin-turn drive unit 3, control must be executed such that right and left drive wheels 32R and 32L are driven in opposite directions at the same rotation rate at all times. Therefore, first spin turn control is implemented by rotating the reference wheel and the controlled wheel in opposite directions and using control in the same manner as straight ahead control. In first spin turn control, drive unit 3 turns with the center point between right and left drive wheels 32R and 32L as the rotational axis. Rotation angle $\theta$ can be calculated based on distance W between right and left drive wheels 32R and 32L and wheel diameter DI using the following equation, after obtaining rotation rate N of right and left drive wheels 32R and 32L via angle sensors such as gyro sensors (omitted in the drawings) or from the rotation rates of drive wheel motors 33R and 33L.

$$\theta = N \times DI/W \qquad (2)$$

Second spin turn control will now be explained. In second spin turn control, working main unit 1 is made to rotate relative to drive unit 3. The rotation of working main unit 1 is attained by rotating rotation drive motor 37. A stepping motor is used as rotation drive motor 37, for example. Therefore, the rotational angle of working main unit 1 can be set at any value by setting the number of pulses to be supplied to the stepping motor.

Third spin turn control will now be explained. In third spin turn control, drive unit 3 only is spin-turned while working main unit 1 stays in its initial position regardless of the spin-turning of drive unit 3. In order to spin-turn drive unit 3 only, drive unit 3 and working main unit 1 must be controlled such that they are spin-turned at the same time and at the same speed but in opposite directions. Specifically, drive unit 3 is rotated using the method of first spin turn control above, its rotation amount and speed are detected, pulses having a cycle corresponding to said amount and speed are supplied to rotation drive motor 37, and working main unit 1 is rotated using second spin turn control.

Figure 9:
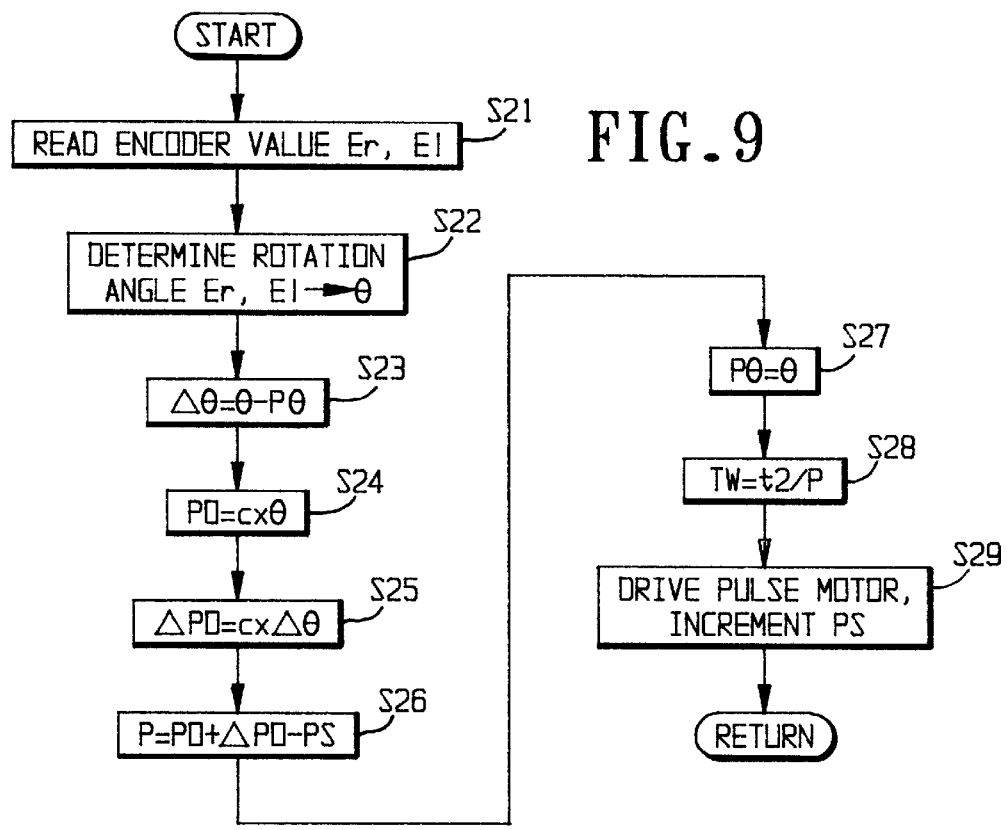
FIG. 9 is a flow chart to explain a third spin turn control method.

FIG. 9 is a flow chart to explain the method of third spin turn control. This control is repeated at prescribed intervals t2 as in the case of straight ahead control. At the time when the control starts, right and left encoder values Er and El and cumulative value PS of the number of pulses supplied to the pulse motor are reset.

First, in step S21, right and left encoder values Er and El are read. Then in step S22, rotation rates N of drive wheels 32R and 32L are obtained from encoder values Er and El and rotational angle $\theta$ of drive unit 3 is obtained using equation (2). In step S23, angular speed $\Delta\theta$ is obtained by subtracting from rotational angle $\theta$ in step S22 rotational angle P$\theta$ obtained at the end of the previous prescribed interval t2. In step S24, target pulse number PO is obtained by converting rotational angle $\theta$ into a number of pulses for rotation drive motor 37 by multiplying rotational angle $\theta$ by prescribed coefficient c.

If drive unit 3 attempts to continue rotating at the rotation speed currently obtained, it will have rotated as much as $\theta + \Delta\theta$ by the end of the next prescribed interval t2. Therefore, it is necessary to rotate rotation drive motor 37 as much as PO+$\Delta$PO pulses during next prescribed interval t2. Here, in step S26, number of pulses P is obtained by subtracting number of pulses PS currently supplied to rotation drive motor 37 from PO+$\Delta$PO and is supplied to rotation drive motor 37 in next prescribed interval t2. Current rotational angle $\theta$ is then saved as P$\theta$. Then, in step S28, pulse interval TW is calculated by multiplying prescribed interval t2 by number of pulses P. In step S29, rotation drive motor 37 is driven with pulse interval TW in next prescribed interval t2. When rotation drive motor 37 is driven, the value of number pulses PS is increased every time a pulse is supplied. Rotation of working main unit 1 synchronized with the rotation of drive unit 3 is realized in the above sequence where the pulse interval supplied to rotation drive motor 37 that causes working main unit 1 to rotate is adjusted in accordance with rotational angle $\theta$ and angular speed $\Delta\theta$.

(3) Example of operation

Figure 10:
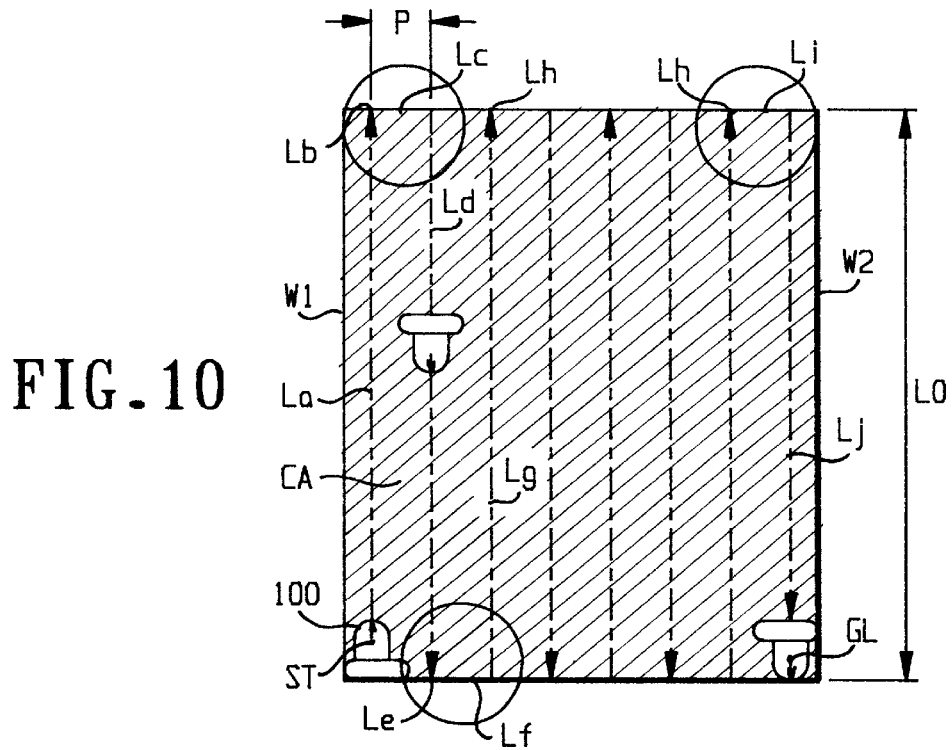
FIG. 10 is a drawing to explain an example of operation of the automatic vehicle at work.

The automatic vehicle of this embodiment performs cleaning work (or waxing) by combining the operation of drive unit 3, based on the five control methods described above, and the operation of working arm 2. FIG. 10 is a drawing to explain an example of operation while the automatic vehicle of this embodiment is at work. In the example shown in FIG. 10, automatic vehicle 100 performs cleaning work while moving in a zigzag fashion in cleaning area CA sandwiched by walls W1 and W2 on either side.

First, automatic vehicle 100 moves straight ahead next to wall W1 from start point ST (La). It stops after travelling set distance L0 (Lb). It then moves prescribed distance P to the right while making a U-turn from a position next to wall W1 (Lc). Here, prescribed distance P is set to be a distance obtained by subtracting the width of an area to be overlapped from the width of working arm 2. Automatic vehicle 100 then moves forward (Ld). It stops after travelling set distance L0 (Le). It then moves to the left by prescribed distance P while making a U-turn (Lf). It then moves forward (Lg). It stops after travelling set distance L0 (Lh). It then repeats steps Lf through Lh described above. Automatic vehicle 100 then arrives next to wall W2 while making a U-turn (Li). It then moves forward along wall W2 (Lj). Finally, it stops after travelling set distance L0, i.e., at the target point (GL). The cleaning of the entire cleaning area CA is completed through the steps described above.

Figures 11A, 11B, 11C, 11D:
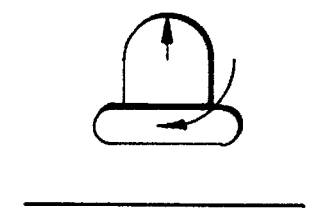
FIG. 11 is a drawing to explain a U-turn from a position next to the wall.
Figures 11E, 11F, 11G, 11H:
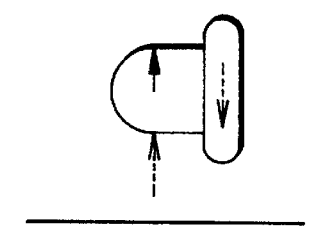

U-turn operation Lc from a position next to a wall shown in FIG. 10 will now be explained in detail. FIG. 11 is a drawing to explain U-turning from a position next to a wall. Arrows on working main unit 1 in FIG. 11 indicate the orientation of drive unit 3 located underneath working main unit 1. The same holds true with regard to other drawings referred to below.

As shown in (a) in FIG. 11, automatic vehicle 100 has the working arm 2 set to the right and stops moving straight ahead at the U-turn point. Drive unit 3 only is then rotated 90 degrees to the right through third spin turn control as shown in (b) in FIG. 11. As shown in (c) in FIG. 11, automatic vehicle 100 then moves to the right a certain distance, i.e., a distance that allows working arm 2 not to touch wall W1 in the next step, for example. At the same time, working arm 2 moves to the central position. Working main unit 1 is then rotated 90 degrees to the right through second spin turn control as shown in (d) in FIG. 11. Then as shown in (e) in FIG. 11, automatic vehicle 100 moves backward until working arm 2 comes into contact with wall W1. Automatic vehicle 100 then moves to the right by said prescribed distance P as shown in (f) in FIG. 11, after which the entire vehicle is rotated 90 degrees to the right through first spin turn control, as shown in (g) in FIG. 11. Lastly, as shown in (h) in FIG. 11, automatic vehicle 100 starts to move straight ahead.

Figures 12A, 12B, 12C, 12D:
FIG. 12 is a drawing to explain the U-turn operation.
Figure 12E:
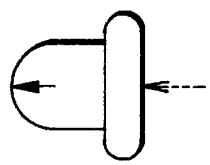

U-turn operation Lf shown in FIG. 10 will now be explained in detail. FIG. 12 is a drawing to explain said U-turn operation.

As shown in (a) in FIG. 12, automatic vehicle 100 stops moving straight ahead at the U-turn point. The entire vehicle is then rotated 90 degrees to the left through first spin turn control as shown in (b) in FIG. 12. Automatic vehicle 100 then moves to the right by said prescribed distance P as shown in (c) in FIG. 12. The entire vehicle is then rotated 90 degrees to the left through first spin turn control as shown in (d) in FIG. 12. Lastly, as shown in (e) in FIG. 12, automatic vehicle 100 starts moving straight ahead.

Operation Li shown in FIG. 10, in which automatic vehicle 100 arrives next to wall W2 while making a U-turn, will now be explained in detail. FIG. 13 is a drawing to explain the operation in which the automatic vehicle arrives next to a wall while making a U-turn. This operation is performed where automatic vehicle 100 arrives next to a wall when it moves laterally by said prescribed distance P.

First, as shown in (a) in FIG. 13, automatic vehicle 100 stops moving straight ahead at the U-turn point. The entire vehicle is then rotated 90 degrees to the left through first spin turn control as shown in (b) in FIG. 13. Automatic vehicle 100 then moves forward until the tip of working main unit 1 comes into contact with wall W2 as shown in (c) in FIG. 13. It then moves backward by a prescribed distance as shown in (d) in FIG. 13. The entire vehicle then is rotated 90 degrees to the right through first spin turn control as shown in (e) in FIG. 13. At the same time, working arm 2 is moved from the central position to a position at which it does not touch wall W2. Lastly, as shown in (f) in FIG. 13, automatic vehicle 100 begins operation Lj, in which it moves straight ahead next to the wall.

The automatic vehicle of this embodiment can work not only in the type of area explained above but also inside a room surrounded by walls on all sides. It can also work in an area of any configuration by combining the five basic steps described above. In this case, the work pattern may be programmed in advance, or it may be easily set by using a function, etc. to automatically prepare its own work pattern through teaching or a work map.

(4) Non-contact contour travel control

In operations Ld and Lg, in which automatic vehicle 100 moves a long distance beside the wall in the example of vehicle operation shown in FIG. 10, automatic vehicle 100 may not move in a perfectly straight line but may operate in a zigzag fashion instead. In this case, the area which has already been cleaned and the next area to be cleaned do not overlap and therefore it may become necessary to re-clean some areas. This problem is caused when automatic vehicle 100 does not move parallel to the wall because it was not accurately positioned parallel to the wall after making a U-turn, or when it cannot move precisely straight ahead even though the right and left drive wheels are rotated at the same speed through straight ahead control because drive wheels 32R and 32L are slipping on the floor of the work area. Therefore, the automatic vehicle of this embodiment is constructed such that it can accurately move straight ahead at all times by means of non-contact contour travel control, in which the vehicle moves along the wall using non-contact sensors that can measure the distance between the vehicle and the wall under non-contact contour travel control.

Various types of sensors may be used as non-contact sensors in this embodiment, including ultrasonic distance measuring sensors, active-type triangulation sensors that project light and calculates the distance to the object based on the position of the light reflected from the object, and passive-type triangulation sensors that sense the image of the object using two image-sensing systems and calculate the object distance from the phase differential between said two systems. However, where passive-type triangulation sensors are used, the object of distance measurement must have some contrast. If the object is solid in color as in the case of a wall, etc., it is necessary to project patterned light.

Figure 45:
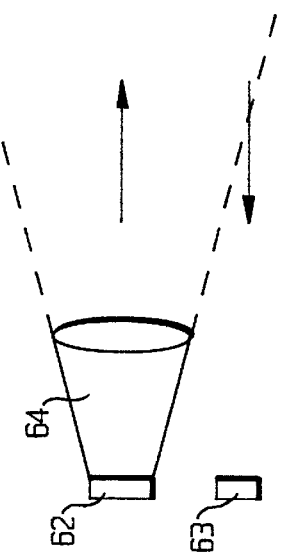
FIG. 45 shows the construction of an ultrasonic distance measuring sensor.

FIG. 45 shows an ultrasonic distance measuring sensor in detail. This distance measuring sensor comprises ultrasound generator 62, cone 64 placed in front of this ultrasound generator 62 and ultrasound receiver 63. The ultrasonic waves generated by ultrasound generator 62 are fanned out by cone 64 and reach the object. The ultrasonic waves reflected off the object are received by ultrasound receiver 63 as reflected waves. CPU 50 counts the period of time between the generation of ultrasonic waves by ultrasound generator 62 and the reception of the said reflected waves by ultrasound receiver 63.

Figure 46:
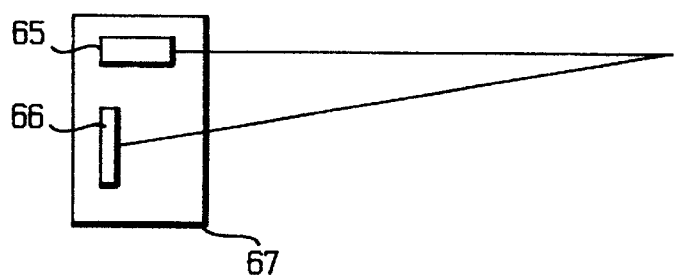
FIG. 46 shows the construction of an active-type distance measuring sensor.

FIG. 46 shows an active-type triangulation distance measuring sensor in detail. This distance measuring sensor is range finder 67 comprising infrared light emitter 65 that generates beams of infrared light and linear sensor 66, which is an infrared light receiving element. Infrared beams emitted from infrared light emitter 65 strike the object, which reflects the infrared beams. The reflected light is received by linear sensor 66. CPU 50 measures the object distance based on the position where the light was received on linear sensor 66.

Non-contact contour travel control using said non-contact sensors will now be explained in detail. In the automatic vehicle of this embodiment, located on either side of working main unit 1 are non-contact distance measuring sensors that can measure the distances in the direction perpendicular to the direction in which the vehicle is moving. It measures distances Dr and Dl between itself and the right and left walls, obtains a value corresponding to the distances to the walls (hereinafter called the 'distance ratio'), which value is described below, and moves along the contour of the wall using this distance ratio. Consequently, in this embodiment, accurate movement along the contour of the wall is possible even if inexpensive sensors are used. The non-contact sensor is not limited to locations on either side of working main unit 1. The non-contact sensor may be rotatably located on the working main unit 1, thereby measuring distances Dr and Dl by rotation of itself.

Figure 14:
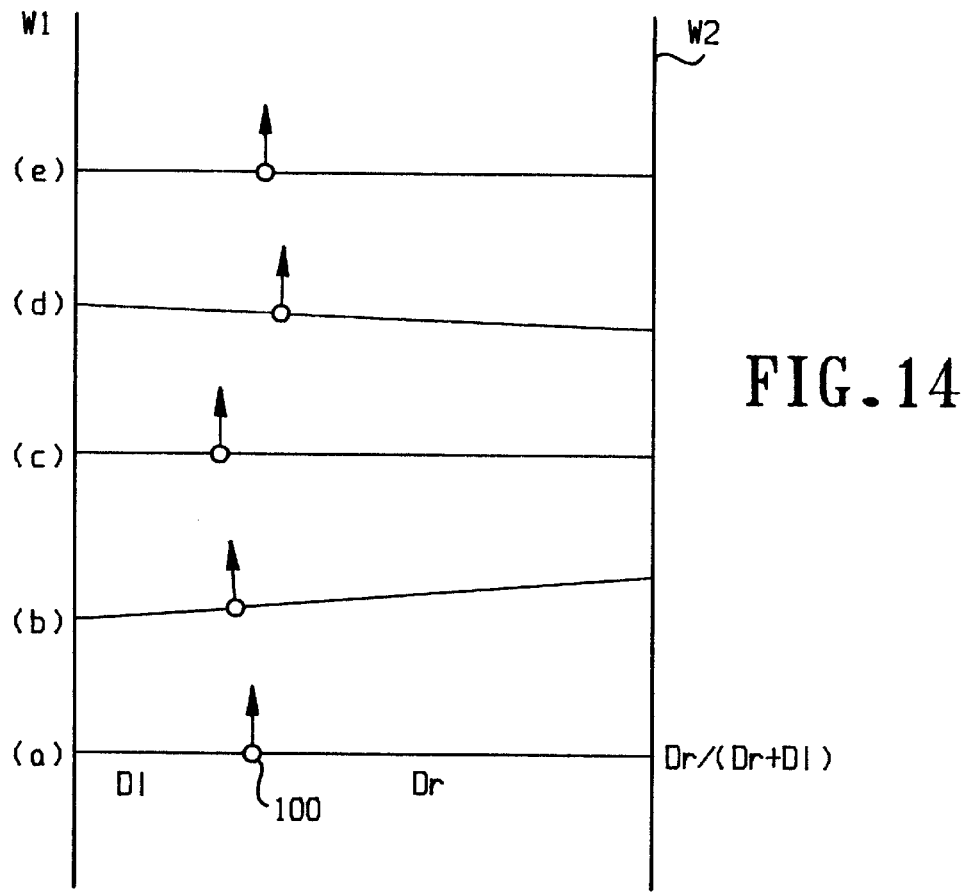
FIG. 14 is a drawing to explain the principle of non-contact contour travel control.

First, the principle of non-contact contour travel control of this embodiment will be explained. FIG. 14 is a drawing to explain the principle of non-contact contour travel control. While the automatic vehicle is moving, distances Dr and Dl to the walls on either side are measured by right and left distance measuring sensors and distance ratio Rp corresponding to the distances between the automatic vehicle and the walls is obtained using the following equation.

$$Rp = Dr/(Dr+Dl) \quad (3)$$

The distance ratio described above may be treated as a value equivalent to the distances between the automatic vehicle and the walls where the walls facing each other are parallel to each other, as in ordinary hallways and rooms. By doing this, there is an advantage that the value does not vary depending on whether or not the automatic vehicle is parallel to the wall that it should move beside. Rp is not limited to a value obtained through said equation (3), however, but may be obtained using other equations as long as it is a value that corresponds to the ratio between Dr and Dl, such as Dr/Dl.

With reference to FIG. 14, distance ratio Rp0 prior to the commencement of movement is calculated in the situation shown in (a) in FIG. 14 before the automatic vehicle begins moving. Then, in the situation shown in (b) in FIG. 14, distance ratio Rp during movement is calculated. In this case, although the automatic vehicle is not parallel to the walls, the same value of distance ratio Rp that would be obtained if the automatic vehicle were parallel to the walls is obtained. In addition, since Rp>Rp0 (the automatic vehicle is positioned to the left of the position where it should be while moving) in this case, automatic vehicle 100 is made to turn to the right. Then, in the situation shown in (c) in FIG. 14, distance ratio Rp during movement is calculated in the same manner as indicated above. Here, although automatic vehicle 100 is parallel to the walls, since Rp>Rp0, it is made to turn further to the right. Then, in the situation shown in (d) in FIG. 14, distance ratio Rp during movement is calculated in the same manner as described above. In this case, since Rp<Rp0 (the automatic vehicle is positioned to the right of the position where it should be while moving), automatic vehicle 100 is made to turn to the left. Then, in the situation shown in (e) in FIG. 14, distance ratio Rp during movement is calculated in the same manner as described above. In this case, since Rp=Rp0 (the automatic vehicle is in the position where it should be while moving), automatic vehicle 100 is made to move straight ahead.

By measuring the distances to the walls on either side while automatic vehicle 100 is moving, calculating distance ratio Rp at each measurement point, and controlling automatic vehicle 100 such that calculated distance ratio Rp becomes the same as distance ratio Rp0 obtained before the vehicle started moving, automatic vehicle 100 can accurately move straight ahead between the walls.

Figure 15:
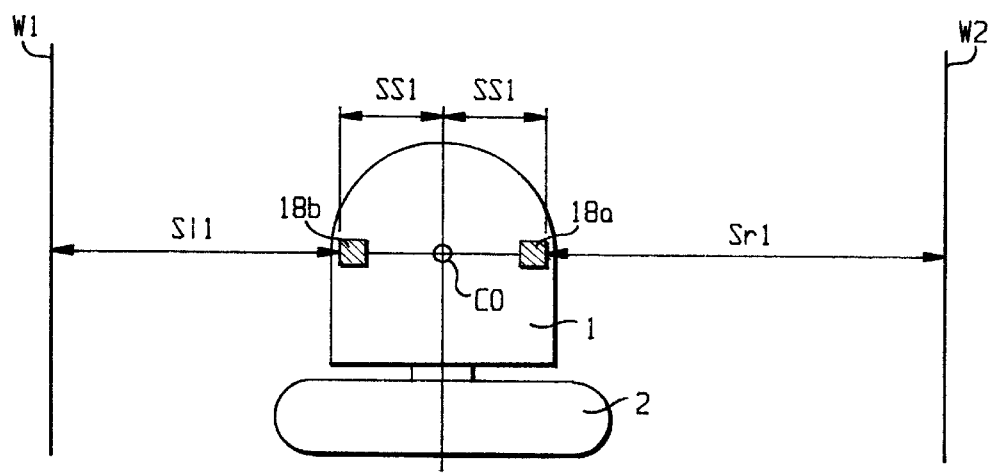
FIG. 15 is a first drawing showing an example in which non-contact sensors are positioned on both sides of the representative position.
Figure 16:
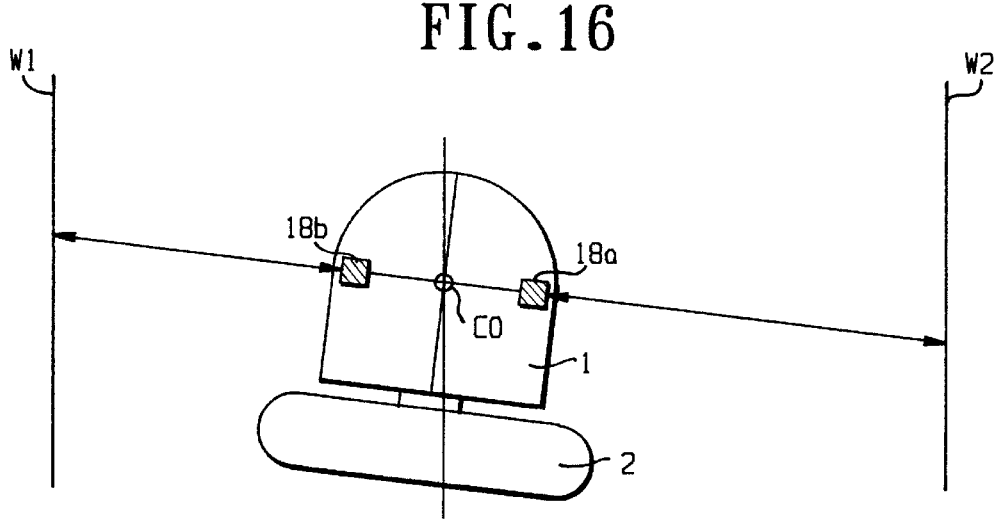
FIG. 16 is a second drawing showing an example in which non-contact sensors are positioned on both sides of the representative position.

The positions at which the non-contact sensors that comprise the distance measuring sensors are mounted will now be explained. First, a case where non-contact sensors are mounted on either side of the rotational axis of working main unit 1 (which axis is hereinafter termed the 'representative position') will be explained. FIGS. 15 and 16 show an example in which non-contact sensors are mounted on either side of the representative position. FIG. 15 shows a situation in which the automatic vehicle is aligned parallel to walls W1 and W2 located on either side while FIG. 16 shows a situation where it is not. In the situations shown in FIGS. 15 and 16, distances Dr and Dl between walls W1 and W2 and the representative position can be obtained by adding distance SS1 between representative position C0 and each of the non-contact sensors to actual measurement values Sr1 and Sl1 obtained by non-contact sensors 18a and 18b. Where the distances between representative position C0 and walls W1 and W2 are the same, the same distance ratio is obtained regardless of whether the automatic vehicle is aligned parallel to the walls (FIG. 15) or diagonal to them (FIG. 16).

Figure 17:
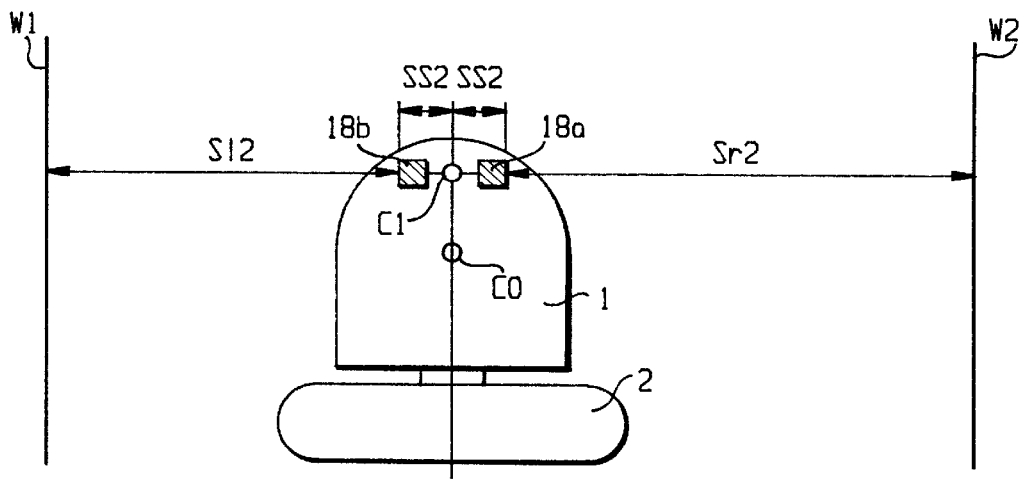
FIG. 17 is a first drawing showing an example in which non-contact sensors are positioned in front of the representative position.
Figure 18:
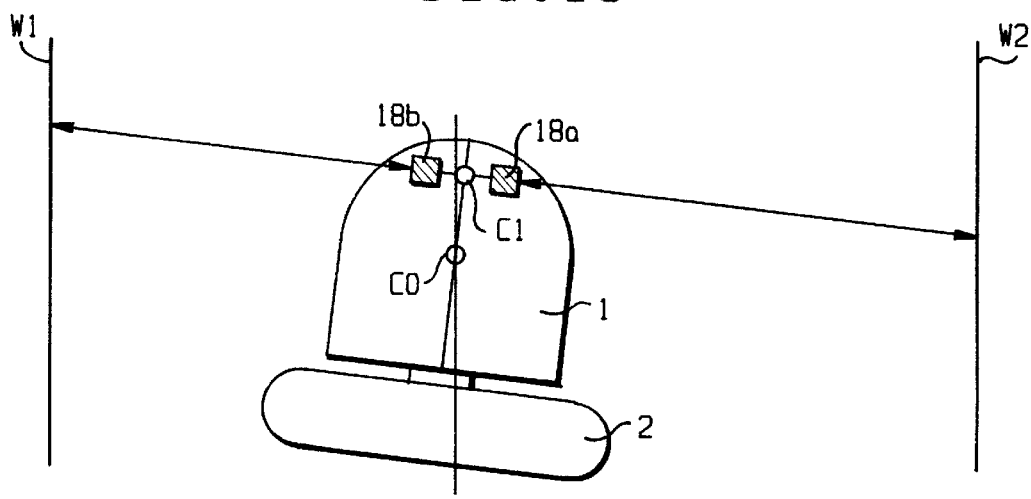
FIG. 18 is a second drawing showing an example in which non-contact sensors are positioned in front of the representative position.

A case in which non-contact sensors are mounted in front of the representative position will now be explained. FIGS. 17 and 18 show an example in which non-contact sensors are mounted in front of the representative position. FIG. 17 shows a case in which the automatic vehicle is aligned parallel to walls W1 and W2, while FIG. 18 shows a case where it is not. Distances Dr and Dl between walls W1 and W2 and front representative position C1, which is located in front of representative position C0, can be obtained by adding distance SS2 between front representative position C1 and non-contact sensors 18a and 18b, respectively, to actual measurement values Sr2 and Sl2 obtained by non-contact sensors 18a and 18b.

The distance ratio when the automatic vehicle is aligned parallel to walls W1 and W2 as shown in FIG. 17 is the same as that obtained with representative position C0 as the reference point. On the other hand, the distance ratio when the automatic vehicle is not parallel to walls W1 and W2, as shown in FIG. 18, is slightly smaller than that obtained with representative position C0 as the reference point, due to the influence of the tilting of the automatic vehicle relative to the direction of movement. Therefore, when representative position C0 is at a position at which the distance ratio is the same as distance ratio Rp0 prior to movement, where the automatic vehicle is parallel to walls W1 and W2, the distance ratio calculated with front representative position C1 as the reference point is the same as distance ratio Rp0 prior to movement, but where the automatic vehicle is tilted to the right, the distance ratio calculated with front representative position C1 as the reference point becomes smaller than distance ratio Rp0 prior to movement. Therefore, by mounting the non-contact sensors in front of the representative position as in this example, the tilting of the automatic vehicle can be accurately detected, as a result of which the direction in which representative position C0 of the automatic vehicle is moving can be predicted. Consequently, by performing non-contact contour travel control using the distance ratio with front representative position C1 as the reference point, delays in control are reduced and the automatic vehicle can move smoothly.

The sequence for the detection of tilting relative to the direction of movement using the non-contact sensors shown in FIGS. 17 and 18 will now be explained. In tasks such as cleaning and waxing, the appearance of the area after the completion of work is important. Therefore, where such work is performed, it is necessary to control the automatic vehicle such that it maintains straight ahead movement relative to the walls to the extent possible. Consequently, in the automatic vehicle of this embodiment, tilt VRp relative to the walls is detected using non-contact sensors located as shown in FIGS. 17 and 18, said tilt VRp being used in non-control contour travel control explained below. Tilt VRp is obtained from the difference between distance ratio PRp based on the distances from the walls measured at the end of the previous prescribed interval t3 and current distance ratio Rp. In addition, the distances between the automatic vehicle and the walls on either side are measured when the automatic vehicle begins moving straight ahead along the contour of the wall, such that distance ratio RP0 that is used as a reference is obtained, and non-contact contour travel control shown below is thereafter carried out at prescribed intervals t3.

Figure 19:
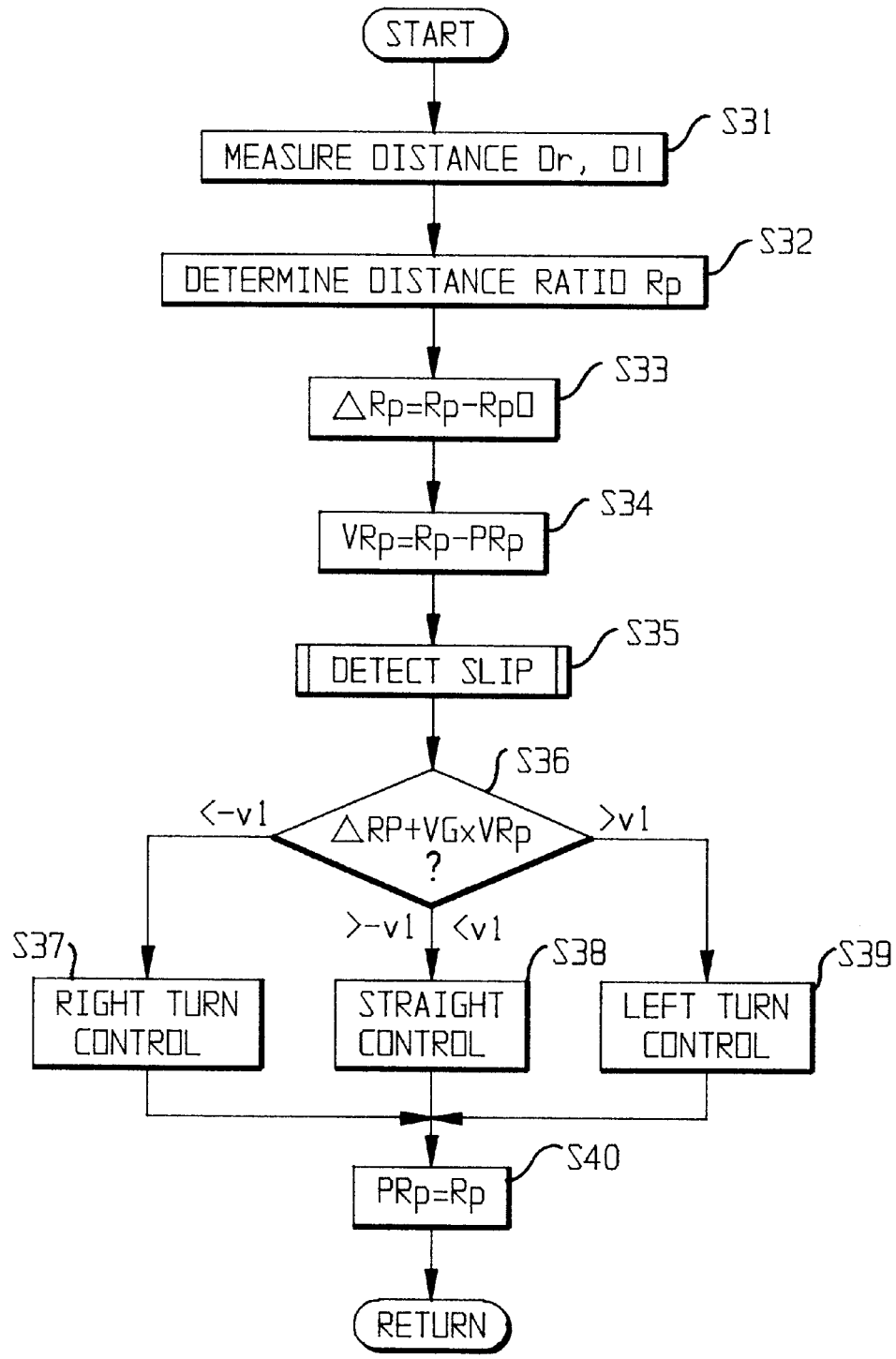
FIG. 19 is a flow chart to explain the non-contact contour travel control method in which non-contact sensors shown in FIGS. 17 and 18 are used.

FIG. 19 is a flow chart to explain non-contact contour travel control using the non-contact sensors shown in FIGS. 17 and 18.

With reference to FIG. 19, first, in step S31, the distances to the walls on either side are measured using non-contact sensors 18a and 18b, and distances Dr and Dl between front representative position C1 and the respective walls are calculated. Then, in step S32, distance ratio Rp is calculated in accordance with equation (3). In step S33, differential ΔRp between distance ratio Rp and reference distance ratio Rp0 is calculated. In step S34, distance ratio PRp at the end of the previous prescribed interval t3 is then subtracted from distance ratio Rp and tilt VRp relative to the direction of movement is calculated. In step S35, the slipping detection routine described below is performed.

In step S36, a performance function is calculated. In this performance function, the product of degree of tilt VRp relative to the direction of movement and prescribed weight VG is added to distance ratio difference ΔRp. Where the value of the performance function is larger than prescribed set value v1, left turn control is carried out in step S39. Where said value is between set value −v1 and v1, straight ahead control is carried out in step S38. Where said value is smaller than set value −v1, right turn control is carried out in step S37. The amount of turn (turning radius) may be adjusted depending on the value of the performance function. Then, in step S40, current distance ratio Rp is saved as distance ratio PRp obtained at the end of previous prescribed interval t3.

Through the processes described above, control in which attention is paid to both the automatic vehicle's position relative to the walls and the degree to which it is aligned parallel to the walls that are parallel to the direction of movement can be attained. The control operation described above is not limited to the method shown in FIG. 19. For example, control may be performed using a table that obtains the turn control amount from the vehicle's position relative to the walls and the degree of parallel alignment with the walls that are parallel to the direction of movement.

The slipping detection routine will now be explained in detail. Where slipping occurs between the drive wheels and the floor, even if the drive wheels are rotated such that the speeds of the right and left wheels meet a certain ratio when making a turn, the automatic vehicle itself may in actuality not turn, or may turn excessively. There are also cases where the automatic vehicle may turn even where straight ahead control is carried out. Therefore, in this embodiment, the influence of slipping that occurs during drive control operations such as turn control and straight ahead control is determined based on the distance measurement result obtained by means of the non-contact sensors explained above, and the amount of turn control is adjusted where necessary.

First, the principle used in the detection of slipping of the drive wheels will be explained. FIG. 20 is a drawing to explain the locus of movement of the automatic vehicle during turning. If degree of change in the direction of movement of the automatic vehicle during prescribed interval t3 is degree of turn ΔT and the moving speed of the automatic vehicle is V, degree of turn ΔT expected when the automatic vehicle is turning at right and left wheel speed ratio R can be obtained via the following equation using turning radius C obtained by equation (1).

$$\Delta T = V \times t3 / C \quad (4)$$

The unit of measurement of degree of turn ΔT is a radian. If left drive wheel 32L is the reference wheel, turning to the left is deemed turning in the positive direction.

Actual degree of turn ΔTr (radian) can be obtained in an approximate fashion using the following equation, based on amount of change ΔVRp in degree of tilt VRp relative to the direction of movement that is obtained from the outputs of the non-contact sensors during movement.

$$\Delta Tr = \Delta VRp \times (Dr + Dl) / (V \times t3) \quad (5)$$

Degree of turn ΔT obtained from the turn control amount and degree of turn ΔTr obtained from the distance measurement values during movement are then compared. If there is no difference between the two, it is determined that slipping of the wheels did not occur, while if there is a large difference, it is determined that slipping of the wheels did occur.

Figure 21:
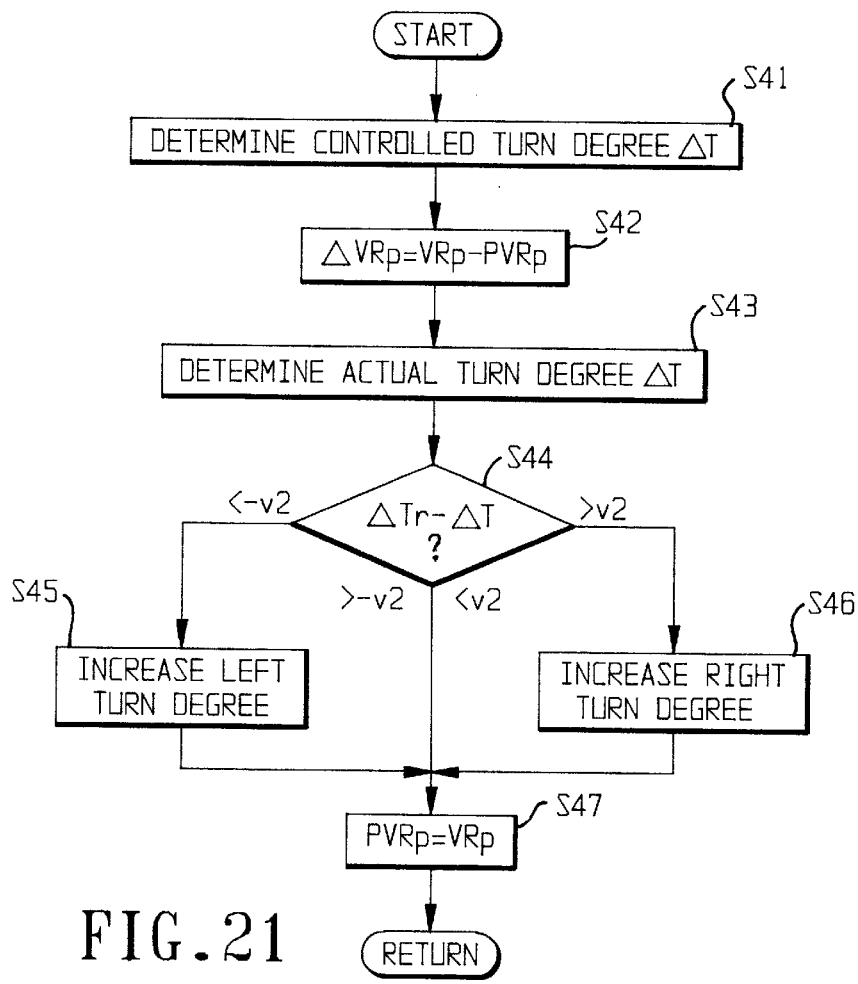
FIG. 21 is a flow chart to explain the slipping detection routine shown in FIG. 19.

The slipping detection routine using this principle for the detection of slipping of the wheels will now be explained in detail. FIG. 21 is a flow chart to explain the slipping detection routine shown in FIG. 19.

First, in step S41, degree of turn ΔT is obtained from the control amount currently used for the movement of the automatic vehicle. Next, in step S42, degree of tilt PVRp obtained at the end of previous prescribed interval t3 is subtracted from degree of tilt VRp obtained from the outputs of the non-contact sensors, and amount of change ΔVRp in the tilt relative to the direction of movement is obtained. In step S43, actual degree of turn ΔTr is obtained based on amount of change in tilt ΔVRp using equation (5). In step S44, actual degree of turn ΔTr and degree of turn ΔT obtained from the actual control amount are compared. If the difference between the two is larger than prescribed set value v2, the automatic vehicle is turning to the left excessively. Therefore, the turn control amount (ratio of right and left wheel speeds) is reduced in step S46 such that the degree of turn to the right is increased. If the difference between the two is between set value −v2 and v2, it is determined that slipping of the wheels did not occur and the automatic vehicle is allowed to continue to move without any additional control. If the difference between the two is smaller than set value −v2, the automatic vehicle is turning to the right excessively, and therefore the turn control amount is increased in step S45 such that the degree of turn to the left is increased. Next, in step S47, current degree of tilt VRp is saved as degree of tilt PVRp obtained at the end of previous prescribed interval t3.

Using the control sequence described above, in the event the actual degree of turn is larger than the degree of turn expected from the control amount (the automatic vehicle is turning to the left excessively), where the automatic vehicle was meant to turn to the right but does not turn much or turns to the left, where the vehicle was meant to go forward but turns to the left, or where the vehicle turns to the left excessively, speed ratio R between the right and left wheels is increased such that the degree of turn to the right is increased and the originally intended control can be realized. Conversely, in the event the actual degree of turn is smaller than the degree of turn expected from the control amount (the automatic vehicle is turning to the right excessively), where the automatic vehicle was meant to turn to the left but does not turn much or turns to the right, where the vehicle was meant to go forward but turns to the right, or where the vehicle turns to the right excessively, speed ratio R between the right and left wheels is reduced such that the degree of turn to the left is increased and the originally intended control can be realized in this case as well.

(5) Exceptions in non-contact contour travel control

In the automatic vehicle of this embodiment in which the non-contact sensors described above are used, in addition to the non-contact contour travel control described above, various processes to deal with exceptions in non-contact contour travel control are carried out when one of the measured distances has suddenly changed, when one of the measured distances has suddenly changed and then become stable again, or when the automatic vehicle has deviated from a distance measurement range regarding which one of the non-contact sensors has performed distance measurement.

First, where one of the distance measurement results from either of the non-contact sensors has suddenly changed, non-contact contour travel control described above is stopped and straight ahead control is carried out. Therefore, the automatic vehicle can move straight ahead without being influenced by concave areas such as doorways and things other than walls such as people and fire extinguishers within the work range. This control is effective when straight ahead movement is important, as in the case where the automatic vehicle moves while performing work such as cleaning and waxing that requires that the target area have a good appearance after the work is performed.

Where one of the distance measurement results from either of the non-contact sensors has stabilized after suddenly changing and necessitating straight ahead control as described above, the distance measured at that point in time is used as the reference distance and the non-contact contour travel control described above is resumed. Therefore, errors in straight ahead control can be reduced by detecting that there are no further sudden changes in the wall and by once again carrying out non-contact contour travel control using the wall.

Where the automatic vehicle has deviated from a distance range for which one of the non-contact sensors performs distance measurement, control is carried out such that the automatic vehicle returns to the sensor's distance measurement range. Where non-contact contour travel control using non-contact sensors is carried out, there are cases in which the automatic vehicle comes too close to the wall, deviating from the distance measurement range of one of the sensors, resulting in the sensor's not being able to perform distance measurement and the automatic vehicle's not being able to continue movement along the contour of the wall. In the automatic vehicle of this embodiment, when such a situation occurs, control takes place such that the automatic vehicle is returned to the non-contact sensor's distance measurement range, whereupon non-contact contour travel control resumes.

Figure 22:
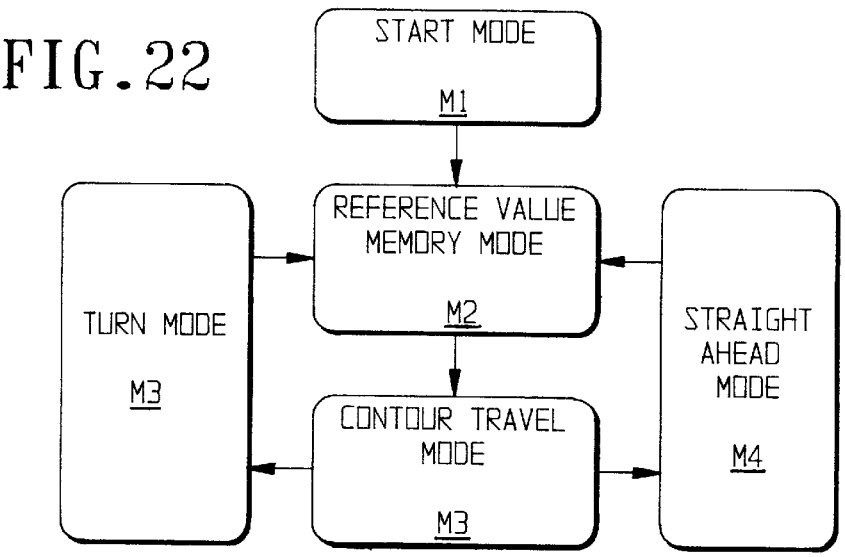
FIG. 22 is a drawing showing changes in the operation mode.

The changes in operation mode pertaining to the performance of the operations described above will now be explained. FIG. 22 is a drawing showing changes in the operation mode. With reference to FIG. 22, the automatic vehicle of this embodiment has five operation modes to perform the operations described above: start mode M1, reference value memory mode M2, contour travel mode M3, straight ahead mode M4, and turn mode M5.

First, the automatic vehicle starts moving in start mode M1. Next, in reference value memory mode M2, distance ratio reference value Rp0 is obtained. In this reference value memory mode M2, when the mode is changed from start mode M1 to reference value memory mode M2, the reference value thus obtained is saved in reference value memory unit 52 (shown in FIG. 44), and said value is used as the reference value in contour travel mode M3 that follows. When the mode is changed to reference value memory mode M2 from a mode other than start mode M1, said obtained reference value and the reference value previously used in contour travel mode M3 are compared. If said values are close to each other, it is determined that the wall has resumed the original contour, and the reference value previously used in contour travel mode M3 continues to be used. On the other hand, where said values are different, it is determined that there is a step-like change or similar variation in the contour of the wall, and said obtained reference value is saved in reference value memory unit 52 and used as the reference value in contour travel mode M3 that follow.

In contour travel mode M3, contour travel control is carried out such that the distance ratio becomes reference value Rp0. In straight ahead mode M4, straight ahead control is implemented. In turn mode M5, where the automatic vehicle is too close to the wall, etc., and distance measurement to the wall cannot be performed, turn control is carried out such that the vehicle turns in the direction opposite to the non-contact sensor that is unable to perform distance measurement.

Changes in the operation mode will now be explained. Where a measured distance has suddenly changed in contour travel mode M3, it is determined that the wall is not flat and contour travel control in which the vehicle moves along the contour of the wall is stopped, whereupon the mode changes to straight ahead mode M4. Where the measured distance has stabilized in straight ahead mode M4, it is determined that there are flat walls on either side and the mode changes to reference value memory mode M2. Where the distance to the wall on the side of a non-contact sensor closer to the wall has become smaller than the minimum measurable distance and the non-contact sensor on that side can no longer perform distance measurement in contour travel mode M3, the mode changes to turn mode M5. Where non-contact sensors on both sides can perform distance measurement in turn mode M5, the mode changes to reference value memory mode M2 and a distance ratio reference value is saved.

Figure 23:
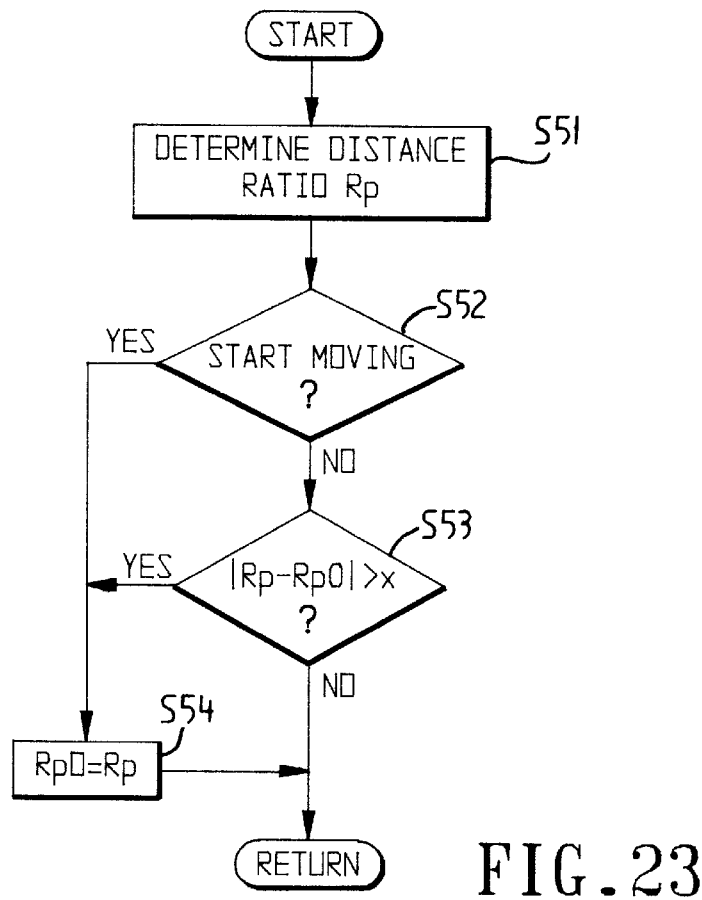
FIG. 23 is a flow chart to explain the sequence of the reference value memory mode.

Reference value memory mode M2 will now be explained in detail. FIG. 23 is a flow chart to explain the sequence in reference value memory mode M2. First, in step S51, distance ratio Rp is obtained. Then, in step S52, it is determined whether or not the original mode prior to activation of reference value memory mode M2 was start mode M1. Where it was start mode M1, distance ratio reference value Rp0 is made distance ratio Rp in step S54 and the process comes to an end. On the other hand, where it was not start mode M1, in step S53, distance ratio reference value Rp0 is subtracted from distance ratio Rp obtained in step S51, and it is determined whether or not the absolute value of the difference is larger than prescribed set value x. Where it is larger than set value x, distance ratio reference value Rp0 is made distance ratio Rp in step S54, and where it is smaller than set value x, the process comes to an end without any further steps.

Figure 24:
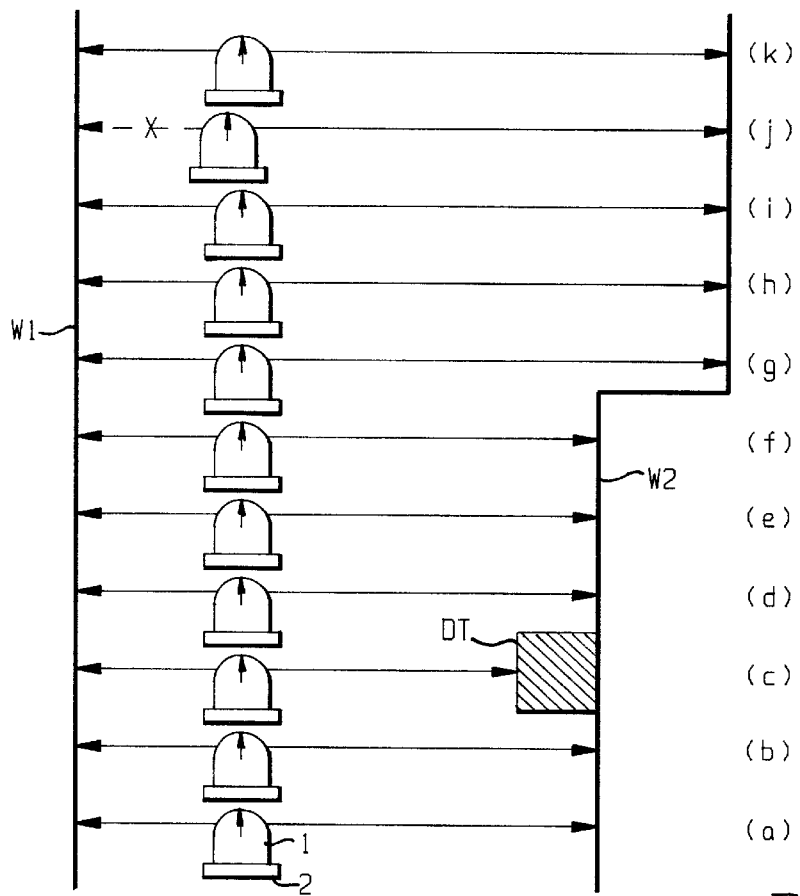
FIG. 24 is a drawing to explain an example of operation according to the mode changes shown in FIG. 22.

An example of operation in accordance with the mode changes described above will now be explained. FIG. 24 is a drawing to explain the example of operation in accordance with the mode changes shown in FIG. 22.

First, as shown in FIG. 24 at (a), distance ratio reference value Rp0 is obtained and saved when the automatic vehicle starts moving. Then, as shown in FIG. 24 at (b), contour travel control is carried out in contour travel mode M3 such that the distance ratio becomes reference value Rp0. Next, as shown in FIG. 24 at (c), where there is a slight protrusion on one of the walls, the measured distance value pertaining to that wall suddenly changes, and therefore the mode changes to straight ahead mode M4. Then, as shown in FIG. 24 at (d), since the measured distance value changes again immediately after the vehicle has passed the protrusion on the wall, straight ahead mode M4 is maintained.

Next, as shown in FIG. 24 at (e), the measured distance value stabilizes after the vehicle passes the protrusion on the wall, and therefore the mode changes to contour travel mode M3 via reference value memory mode M2. When this happens, because the wall has resumed the original contour, currently measured distance ratio Rp1 is approximately the same as distance ratio reference value Rp0 obtained when the vehicle started moving, and therefore reference value Rp0 will continue to be used. Then, as shown in FIG. 24 at (f), non-contact contour travel control is carried out in contour travel mode M3 such that the distance ratio becomes reference value Rp0.

Next, as shown in FIG. 24 at (g), where there is a step-like change in the contour of the wall, the measured distance value pertaining to that wall suddenly changes. Therefore, the mode changes to straight ahead mode M4. Then, as shown in FIG. 24 at (h), because the measured distance value stabilizes after the vehicle passes the step-like change in the contour of the wall, the mode changes to contour travel mode M3 via reference value memory mode M2. When this happens, since the vehicle has passed the change in the contour of the wall and distance ratio Rp2 currently measured and distance ratio reference value Rp0 previously used are different, recently measured distance ratio Rp2 is saved as the reference value.

Next, as shown in FIG. 24 at (i), non-contact contour travel control is carried out in contour travel mode M3 such that the distance ratio becomes reference value Rp2. Then, as shown in FIG. 24 at (j), where the automatic vehicle has come too close to one of the walls, such that the distance to that wall is smaller than the minimum measurable distance for the non-contact sensor located on the side of that wall and that non-contact sensor can no longer perform distance measurement, the mode changes to turn mode M5. In other words, the vehicle is made to move in the opposite direction of the wall to which it is too close in order to continue non-contact contour travel control.

Finally, as shown in FIG. 24 at (k), when distance measurement has become possible for the non-contact sensors on either side, the mode changes to contour travel mode M3 via reference value memory mode M2. Here, because the automatic vehicle has resumed its original position, currently measured distance ratio Rp3 is approximately the same as previously used distance ratio reference value Rp2. Therefore, reference value Rp2 continues to be used and non-contact contour travel control is maintained.

(6) Contact contour travel control

Where straight ahead control is carried out in steps La and Lj in which the automatic vehicle moves straight ahead along the walls in the example of operation shown in FIG. 10, there are cases where the vehicle bumps into one of the walls or moves away from it for the following reasons. Using the non-contact sensors explained above, if the distance between the wall and the sensor is too small, the sensor leaves its measurable distance range, as a result of which the sensor no longer performs distance measurement and contour travel control using the non-contact sensor may no longer be performed. Therefore, because the automatic vehicle is not positioned precisely parallel to the walls after making a U-turn, it may not move parallel to the walls, or if slipping occurs between the drive wheels and the floor, the vehicle may not be able to move precisely straight ahead even if both right and left wheels are rotated at the same speed. Taking this into consideration, in the automatic vehicle of this embodiment, straight ahead control in which the vehicle moves along the contour of a wall is carried out using, in addition to the non-contact sensors described above, contact sensors that can measure the distance to the wall. In addition, in order to make sure that cleaning, including the cleaning of corners, is completely performed, working arm 2 is controlled using the contact sensors such that it stays in contact with the wall.

Figure 25:
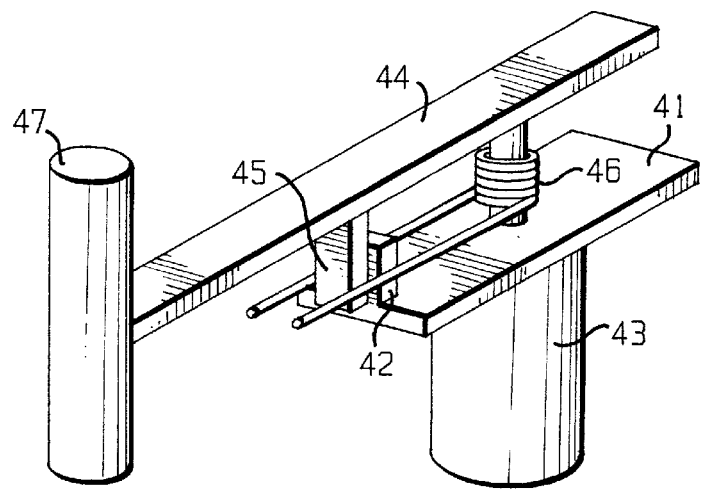
FIG. 25 is a perspective view showing the construction of a contact sensor.

The contact sensors described above will be explained in detail below. FIG. 25 is a perspective view showing the construction of a spring-type touch sensor. Contact sensors are mounted on either side of working main unit 1 such that one sensor is located in front of another, as explained below.

With reference to FIG. 25, the touch sensor includes base 41, base arm 42, potentiometer 43, shaft 44, shaft position determining arm 45, torsion coil spring 46 and contact 47. Base 41 of the contact sensor is fixed on top of potentiometer 43, and the rotational shaft of potentiometer 43 is connected to shaft 44. At the tip of shaft 44 is located contact 47, which comes into contact with the wall. Torsion coil spring 46 is rotatably attached to the rotational shaft of potentiometer 43. It fixes the position of shaft 44 by clamping base arm 42 and shaft position determining arm 45.

Figure 26:
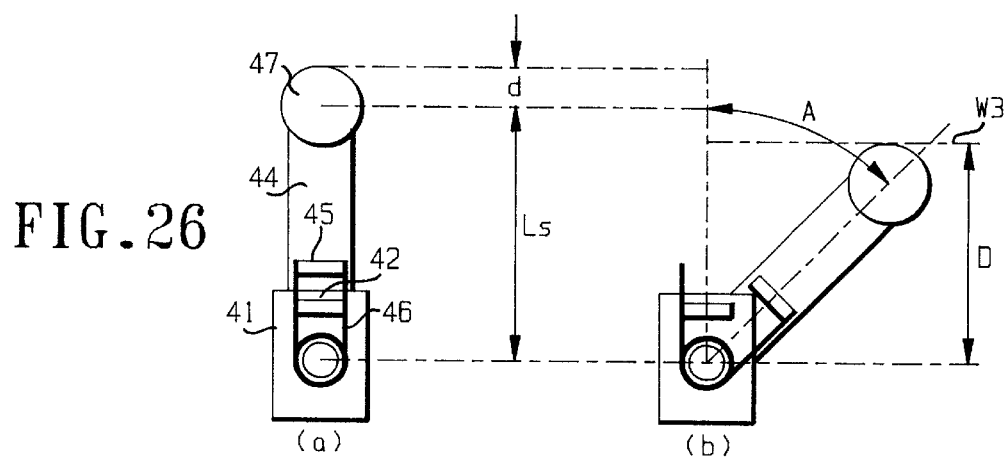
FIG. 26 is a drawing to explain the operation of the contact sensors.

The operation of the contact sensor constructed as described above will now be explained. FIG. 26 is a drawing to explain the operation of the contact sensor.

As shown in FIG. 26 at (a), where contact 47 is not in contact with a wall, torsion coil spring 46 clamps base arm 42 and shaft position determining arm 45, by which shaft 44 is fixed in the direction of base arm 42. When contact 47 comes into contact with wall W1 as shown in FIG. 26 at (b), shaft 44 becomes pushed by wall W3 and rotates around the rotational shaft of potentiometer 43. If this rotational angle is A, the length of shaft 44 is Ls and the radius of contact 47 is d, distance D between the center of the rotational shaft of potentiometer 43 and wall W3 is expressed by the following equation.

$$D = d + Ls \times \cos A \qquad (6)$$

Using this equation, the distance to wall W3 can be measured based on the rotational angle shown by potentiometer 43.

Figure 27:
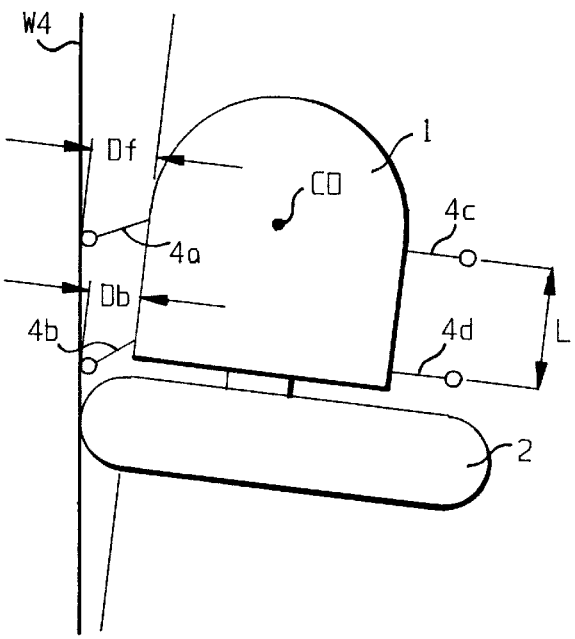
FIG. 27 is a drawing to explain the principle of contact contour travel control using the contact sensors shown in FIG. 26.

Contact contour travel control using the contact sensors described above will now be explained. FIG. 27 is a drawing to explain the principle of contact contour travel control using the contact sensors shown in FIG. 25. With reference to FIG. 27, contact sensors $4a$ through $4d$ are attached to either side of working main unit 1 such that two sensors are located on each side and one sensor is located in front of another. Where the automatic vehicle moves along left wall W4, contact sensors $4a$ and $4b$ on the left side are used, and where the vehicle moves along the right wall, contact sensors 4c and 4d on the right side are used. The distance to the wall measured by front contact sensors 4a or 4c is deemed measured distance Df, and the distance to the wall measured by rear contact sensors 4b or 4d is deemed measured distance Db.

FIG. 27 shows the automatic vehicle moving beside left wall W4. In contour travel control using contact sensors, the vehicle is controlled such that measured distance Df and measured distance Db during movement are equal to reference distance D0, or is controlled through the detection of degree of tilt K relative to the wall, such that degree of tilt K becomes zero. Here, if the distance between the front and rear contact sensors is L, degree of tilt K of the automatic vehicle can be calculated in an approximate fashion using the following equation.

$$K=(Df-Db)/L \quad (7)$$

Figure 28:
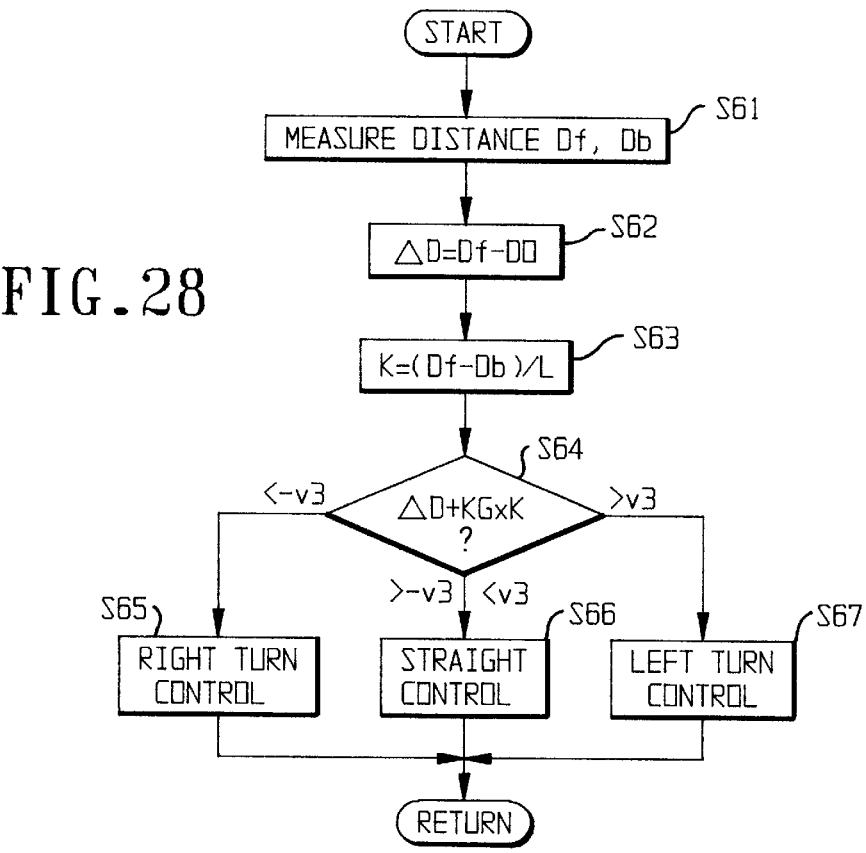
FIG. 28 is a flow chart to explain the method of contact contour travel control using the contact sensors shown in FIG. 25.

Contact contour travel control based on the principle above will now be explained in detail. FIG. 28 is a flow chart to explain contact contour travel control using the contact sensors shown in FIG. 25. This control routine is executed at prescribed intervals t4 under contact contour travel control.

First, in step S61, distances to the wall Df and Db are measured by the front and rear contact sensors touching the wall. Next, in step S62, difference ΔD between measured distance Df measured by the front contact sensor touching the wall and reference distance D0 is obtained. In step S63, degree of tilt K relative to the direction of movement is obtained using equation (7). Then, in step S64, a performance function calculation takes place. Here, as the performance function, the product of degree of tilt K and prescribed gain KG is added to distance difference ΔD. If the value of the performance function is larger than prescribed set value v3, left turn control is carried out in step S67. If said value is between set value −v3 and v3, straight ahead control is executed in step S66. If said value is smaller than set value v3, right turn control takes place in step S65. The amount of turn (turning radius) is adjusted depending on the value of the performance function.

In performing the processes above, the automatic vehicle is controlled using distance Df measured by the front contact sensor on the left side and distance Db measured by the rear contact sensor on the left side. When distance Df is larger than reference value D0, the vehicle may be made to turn toward the wall (to the left) and when said value is smaller, the vehicle may be made to turn away from the wall (to the right). In addition, the tilt of the automatic vehicle relative to the wall is detected based on the difference between measured distances Df and Db. If Df>Db, the automatic vehicle is tilted in the direction of movement away from the wall and therefore the vehicle may be made to turn toward the wall (to the left). In the opposite case, the vehicle may be made to turn in the direction of movement away from the wall (to the right). Therefore, even where the vehicle comes so close that distance measurement cannot be performed by non-contact sensors, straight ahead movement precisely parallel to the wall, or in other words, contact contour travel control, can take place at all times.

In addition, as in the case of contour travel control using non-contact sensors, the turn control amount may be adjusted as necessary in contour travel control using contact sensors as well by determining from the result of distance measurement by the contact sensors the influence of slipping that occurs during drive control such as turn control and straight ahead control. In this case, amount of change ΔK in degree of tilt K relative to the direction of movement that is obtained from the outputs from the contact sensors during movement approximates actual degree of turn ΔTr. Therefore, degree of turn ΔT that is obtained from the amount of turn control using equation (4) and degree of turn ΔTr obtained from the results of distance measurement during movement are compared. If there is no difference between the two values, it may be determined that slipping of the wheels has not occurred, and if there is a large difference, it may be determined that slipping of the wheels has occurred. Contact contour travel control taking into account the detection of slipping can be realized by inserting the sequence for the detection of slipping described above between steps S63 and S64 shown in FIG. 28, as in the case of non-contact contour travel control.

(7) Exceptions in contact contour travel control

Processes to deal with exceptions in contact contour travel control, in which control other than contact contour travel control above is executed, will now be explained. First, the sequence performed when the disappearance of the wall is detected will be explained. This is a sequence in which the disappearance of the wall is detected based on a change in speed in the output by the contact sensors. In other words, where the wall disappears during contour travel control in which the vehicle moves beside the wall, the output of the contact sensors fluctuates dramatically, which is used to detect the disappearance of the wall. In addition, when the contact sensor output is fluctuating, it cannot be determined whether or not the vehicle is in contact with the wall solely based on the contact sensor output. Therefore, where the wall has disappeared while the vehicle is moving beside the wall under contour travel control, contour travel control is stopped and straight ahead control is executed. When this is carried out, however, the vehicle may deviate from its proper path if it moves straight ahead for too long, depending on the orientation of the automatic vehicle immediately before the mode was changed to the straight ahead mode. Therefore, the tilt of the automatic vehicle relative to the wall is saved based on the distance values measured by the front and rear contact sensors immediately before the mode change to straight ahead mode, such that the vehicle starts moving straight ahead only after the tilt is corrected.

Figure 29:
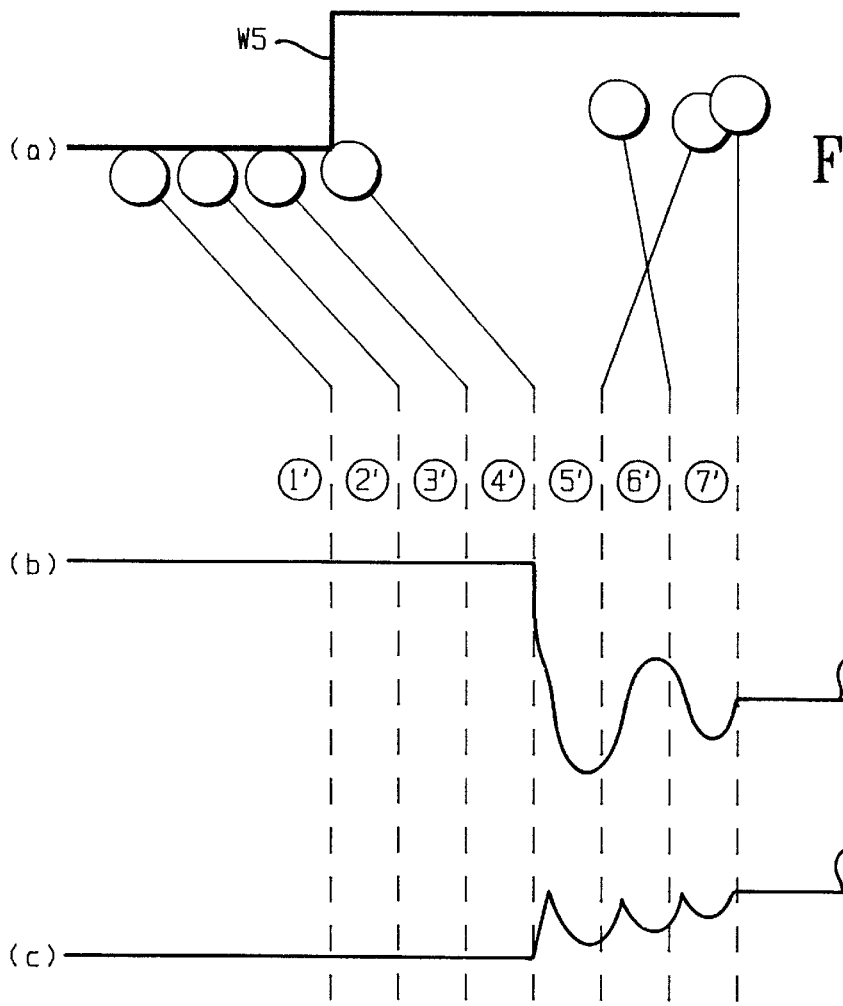
FIG. 29 is a drawing to explain the sequence to detect the disappearance of the wall.

FIG. 29 is a drawing to explain the process to detect the disappearance of the wall described above. FIG. 29 at (a) shows the movement of contact sensor 4 when it passes an area where there is no wall W5. FIG. 29 at (b) represents the sensor angle A that can be obtained from the output values of the potentiometer when contact sensor 4 passes the area where there is no wall W5. FIG. 29 at (c) represents distance value D that can be obtained based on sensor angle A when contact sensor 4 passes the area where there is no wall W5. With reference to FIG. 29, contact sensor 4 is in contact with wall W5 at points (1') through (3'),and loses contact with wall W5 at point (4'). When contact sensor 4 loses contact with the wall, shaft 44 is returned to the center by torsion coil spring 47. However, until it stabilizes in one position, shaft 44 oscillates. Therefore, sensor angle A and distance value D obtained from the output of potentiometer 43 are represented in waveforms shown between points (4) and (7). Although it is pointless to calculate the distance to the wall using sensor angle A while shaft 44 is oscillating, since the sensor output, i.e., sensor angle A or distance value D, is fluctuating, the disappearance of the wall can be detected based on this fluctuation.

The process to detect contact with the wall will now be explained. This is a process to detect that the automatic vehicle has come into contact with the wall during its movement. In this process, the sensor's contact with the wall is detected based on information regarding the angle of the contact sensor. Directly detecting the sensor's contact with the wall through contact sensor's angle information offers detection with higher sensitivity than detecting the sensor's contact with the wall after converting said information into a distance value. In this embodiment, after detecting that the contact sensor has come into contact with the wall, the automatic vehicle travels over a certain distance and then contact contour travel control takes place based on the distance information obtained during said travel over a certain distance.

The detection of the sensor's coming into contact with the wall is performed as follows. Where the sensor has come into contact with a part of the wall running perpendicular to the direction of its movement, it is necessary for the automatic vehicle to move over a certain distance such that the sensor comes into contact with a part of the wall running parallel to the direction of the vehicle's movement before distance measurement is performed. However, detection of the sensor's coming into contact with the wall is not sufficient to determine whether it has come into contact with a part of the wall running perpendicular or parallel to the direction of the vehicle's movement. Therefore, in this embodiment, control based on distance information is carried out after the vehicle is allowed to move over a certain distance regardless of whether or not the wall with which the sensor has come into contact runs perpendicular to the direction of the vehicle's movement.

Figure 30:
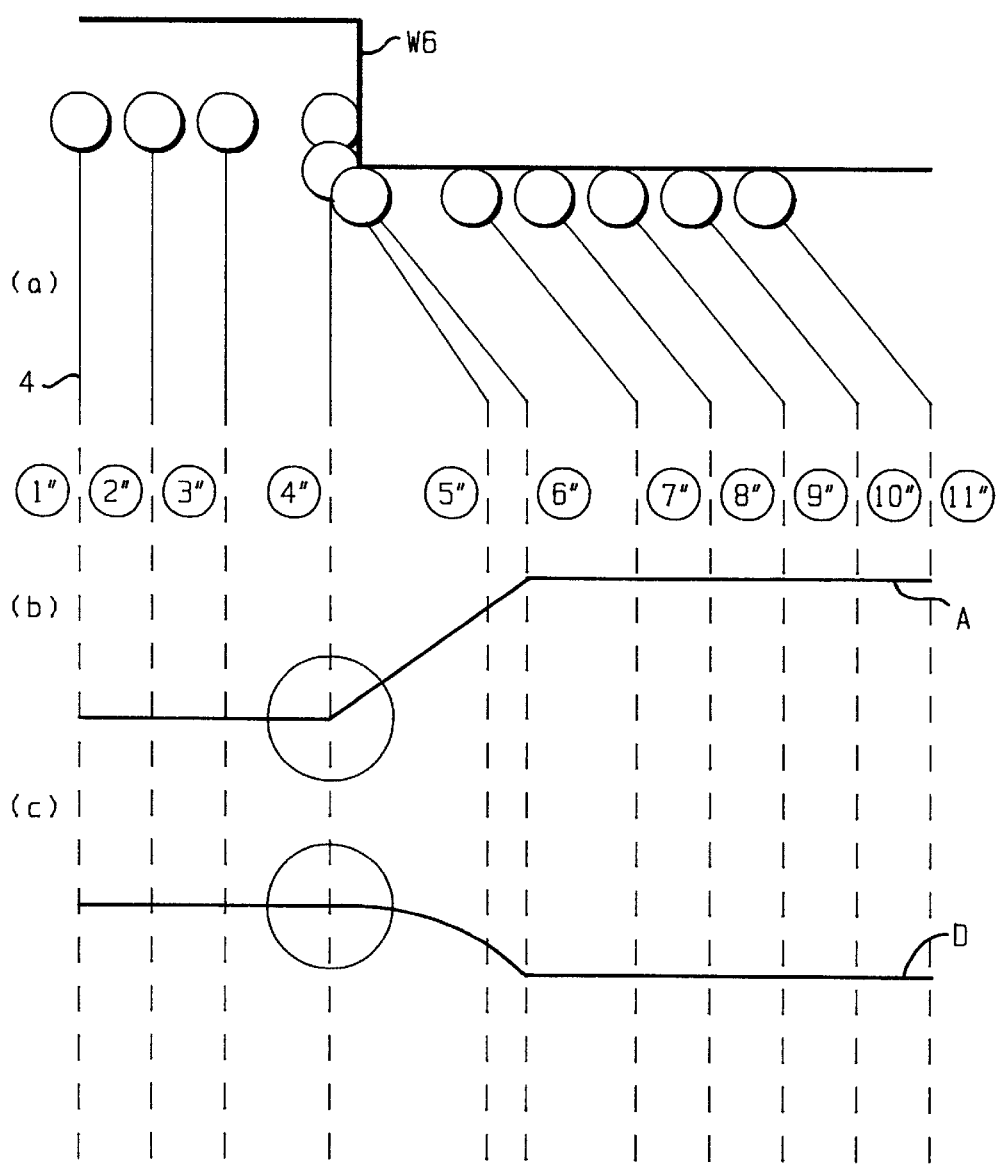
FIG. 30 is a drawing to explain the principle of the sequence for detecting contact with the wall.

The principle of the process to detect the sensor's coming into contact with the wall will now be explained. FIG. 30 is a drawing to explain the principle of said process. FIG. 30 at (a) shows the movement of one of contact sensors 4a–d when it passes an area where there is wall W6 running perpendicular to the direction of the vehicle's movement. FIG. 30 at (b) represents sensor angle A that is obtained from the output of potentiometer 43 when one of contact sensors 4a–d passes the area where there is wall W6 running perpendicular to the direction of the vehicle's movement, and (c) represents distance value D that is obtained based on sensor angle A when one of contact sensors 4a–d passes the area where there is wall W6 running perpendicular to the direction of the vehicle's movement.

In FIG. 30, one of contact sensors 4a–d is not in contact with wall W6 at points (1") through (3"), but it comes into contact with wall W6 at point (4"). After one of contact sensors 4a–d comes into contact with wall W6, the automatic vehicle continues moving forward and shaft 44 rotates against torsion coil spring 47. When this happens, sensor angle A and distance value D obtained from the output of potentiometer 43 are represented by the waveforms shown between points (4") and (6"). Looking at sensor angle A and distance value D immediately after point (4") (circled areas in the drawing), the ratio of change for distance value D is smaller than that for sensor angle A, the former ratio of change being close to zero. As a result, contact sensor coming into contact with wall W6 can be detected more quickly and accurately by using the changes in sensor angle. A.

Between points (4") and (6"), because distance value D calculated from sensor angle A does not represent the distance between the automatic vehicle and wall W6, contact contour travel control is executed after the vehicle is allowed to move under straight ahead control over a prescribed distance following the detection of contact sensor 4 coming into contact with wall W6 and the distance to the wall is measured.

Figure 31:
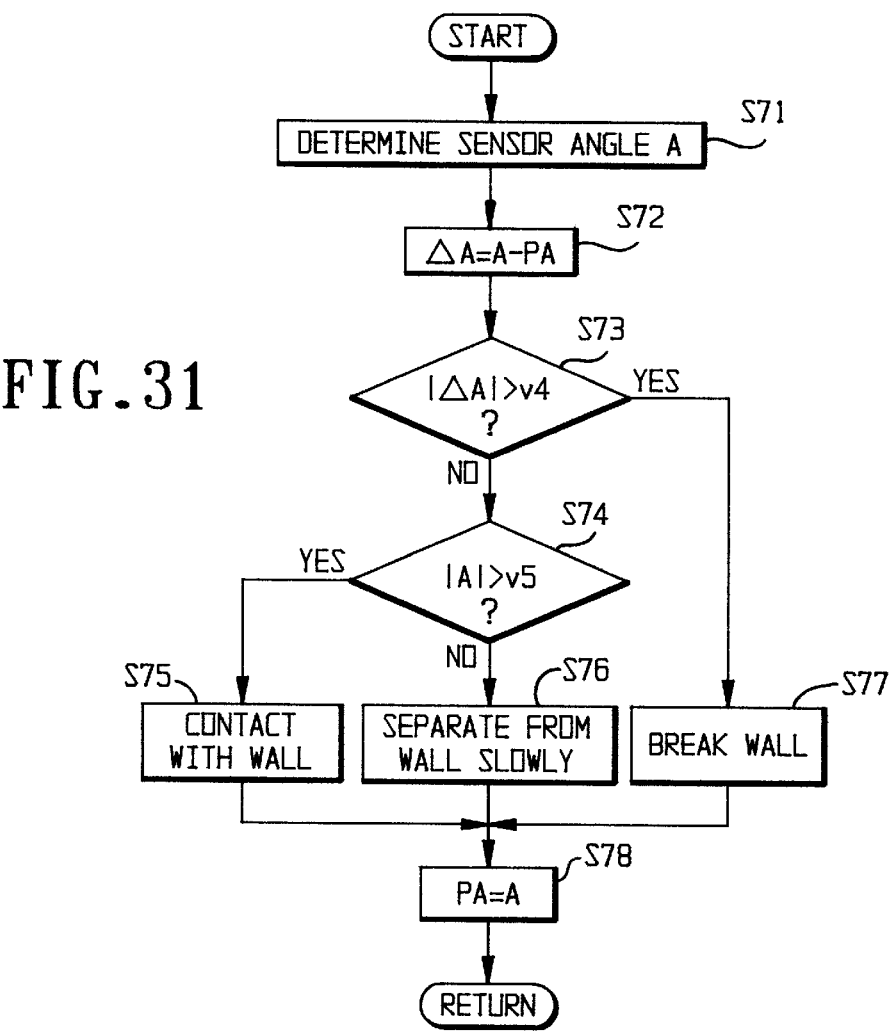
FIG. 31 is a flow chart to explain the sequence for detecting contact with the wall.

The process to detect the sensor's contact with the wall will now be specifically explained. FIG. 31 is a flow chart to explain said process. In the process shown in FIG. 31, the following sequence is carried out at prescribed intervals t5.

First, in step S71, sensor angle A is obtained from the output of potentiometer 43. Next, in step S72, the amount of change ΔA in sensor angle A is obtained by subtracting sensor angle PA obtained at the end of previous prescribed interval t5 from sensor angle A. It is then determined in step S73 whether or not the absolute value of amount of change ΔA in sensor angle A is larger than prescribed set value v4. If it is larger, it is determined that the contact sensor has suddenly lost contact with the wall and the disappearance of the wall is detected in step S77. On the other hand, if it is not larger, it is determined in step S74 whether or not the absolute value of sensor angle A is larger than prescribed set value v5 that is close to zero. If it is larger, it is determined in step S75 that the contact sensor is in contact with the wall. On the other hand, if it is not larger, it is determined in step S76 that the contact sensor has gradually lost contact with the wall. Then in step S78, current sensor angle A is saved as sensor angle PA obtained at the end of previous prescribed interval t5.

Through the process described above, whether the contact sensor is in contact with the wall, whether the wall has disappeared, whether the contact sensor lost contact with the wall gradually, etc., may be detected based on the value of sensor angle A, making it possible to accurately and quickly detect the status of contact between the contact sensor and the wall.

The control method to return the automatic vehicle to the contact sensor's distance measurement range when the automatic vehicle has left the wall, and has therefore left the contact sensor's distance measurement range, will now be explained. When the automatic vehicle of this embodiment is moving under contour travel control using contact sensors, where it detected that the contact sensor has gradually lost contact with the wall, contact contour travel control is continued by controlling the vehicle such that it returns to the contact sensor's distance measurement range.

Figure 32:
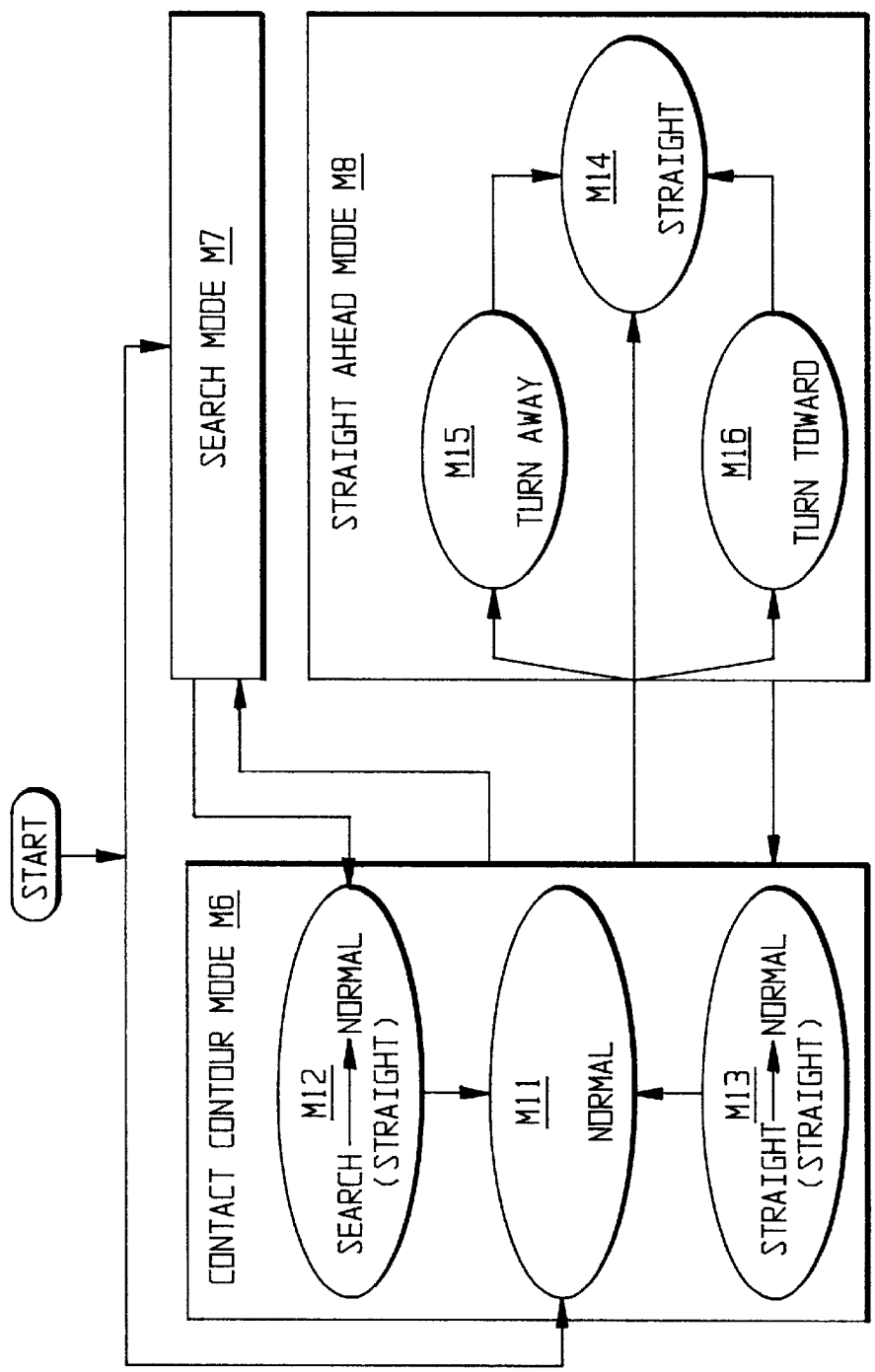
FIG. 32 is a drawing showing changes in the operation mode.

The changes in the operation mode to perform the operation described above will now be explained. FIG. 32 is a drawing showing the changes in the operation mode occurring in connection with the operation described above. In contact contour mode M6, contact contour travel control is carried out using contact sensors that are in contact with the wall. Straight ahead mode M8 has an operation mode used when the wall disappears. In said operation mode, the automatic vehicle moves straight ahead in a direction parallel to the wall beside which it has moved so far. Search mode M7 is an operation mode used when a wall cannot be found. In said mode, the automatic vehicle turns toward the wall.

In first contact contour mode M11, the automatic vehicle moves under contact contour travel control shown in FIG. 28 using the front and rear contact sensors. In second contact contour mode M12, when the mode changes from search mode M7 to contact contour mode M6, after the vehicle has moved straight ahead until the front contact sensor can measure the distance to the wall, the mode changes to first contact contour mode M11.

In first straight ahead mode M14, the automatic vehicle moves straight ahead. In second straight ahead mode M15, when the mode is changed from contact contour mode M6 to straight ahead mode M8, after turn control is executed to make the vehicle turn away from the wall such that it becomes parallel to the wall beside which it has moved so far, the mode changes to second straight ahead mode M15. In third straight ahead mode M16, when the mode changes from contact contour mode M6 to straight ahead mode M8, after turn control is executed to make the vehicle turn toward the wall such that it becomes parallel to the wall beside which it has moved so far, the mode changes to first straight ahead mode M14.

Mode changes among said various modes will now be explained. Where the front contact sensor is in contact with the wall at the start, the mode changes to contact contour mode M6, and where it is not in contact with the wall at the start, the mode changes to search mode M7. Where the front contact sensor has suddenly left the wall while the vehicle is in contact contour mode M6, the mode changes to straight ahead mode M8. When the mode changes from contact contour mode M6 to straight ahead mode M8, where the distance measurement results from the front and rear contact sensors immediately before the sensor loses contact with the wall are almost the same and therefore the automatic vehicle is parallel to the wall, the mode changes to first straight ahead mode M14. When the mode changes from contact contour mode M6 to straight ahead mode M8, where the distance measurement result from the front contact sensor is smaller than that from the rear contact sensor, the mode changes to second straight ahead mode M15. When the mode changes from contact contour mode M6 to straight ahead mode M8, where the distance measurement result from the front contact sensor is larger than that from the rear contact sensor, the mode changes to third straight ahead mode M16.

When the vehicle is in straight ahead mode M8, where it is detected that the front contact sensor has come into contact with the wall, the mode changes to contact contour mode M6. When the vehicle is in contact contour mode M6, where the front contact sensor gradually loses contact with the wall, the mode changes to search mode M7. When the vehicle is in search mode M7, where it is detected that the front contact sensor has come into contact with the wall, the mode changes to contact contour mode M6. Through the mode changes described above, the automatic vehicle is controlled such that it returns to the contact sensor's distance measurement range even when it has moved away from said distance measurement range, ensuring accurate contact contour travel control at all times.

Figures 33, 35:
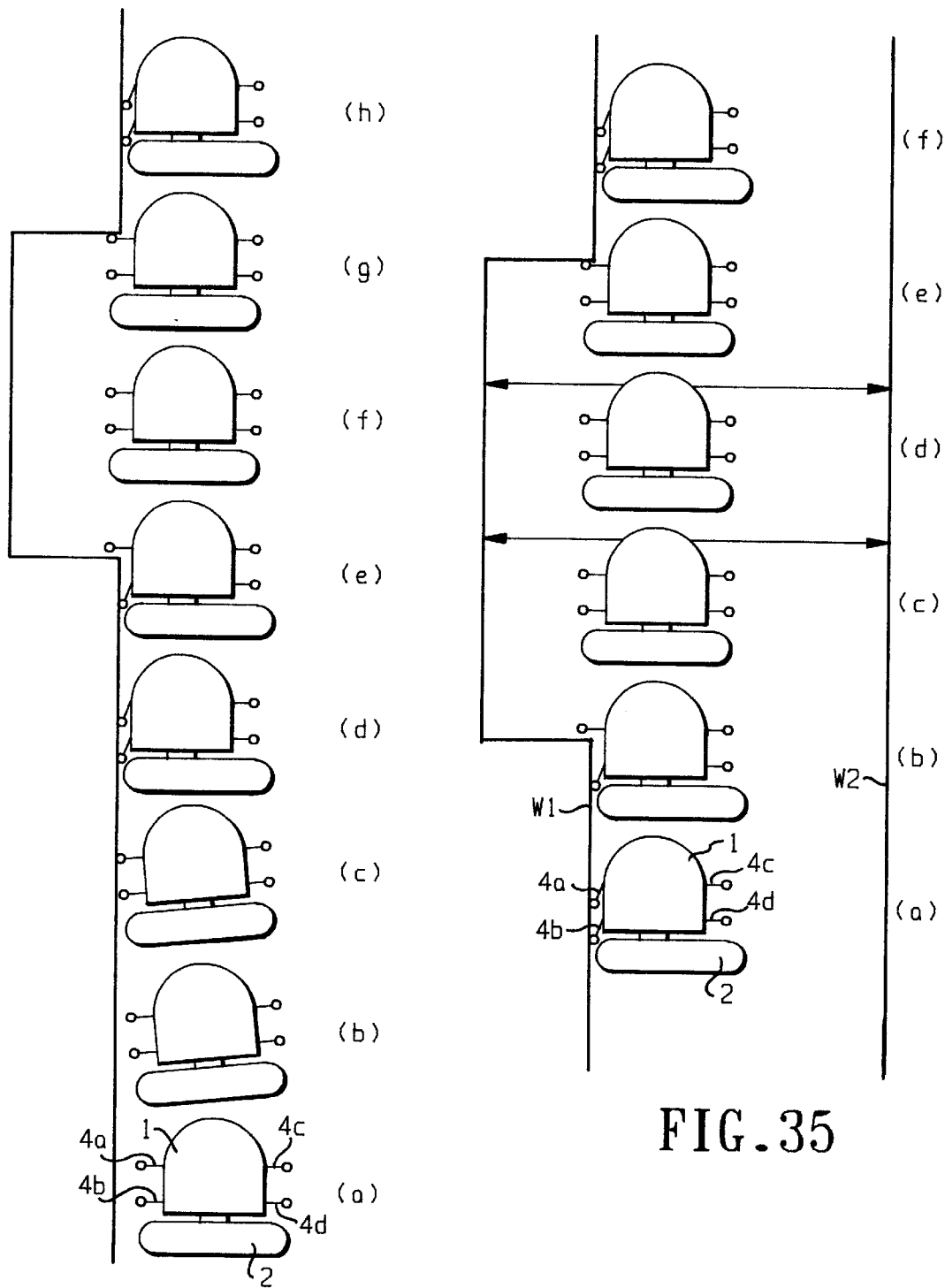
FIG. 33 is a drawing to explain an example of operation according to the mode changes shown in FIG. 32.
FIG. 35 is a drawing to explain an example of operation in accordance with the mode changes shown in FIG. 34.

An example of operation in accordance with the mode changes described above will now be explained. FIG. 33 is a drawing to explain the example of operation in accordance with the mode changes shown in FIG. 31. First, as shown in FIG. 33 at (a), it is detected when the vehicle starts moving that the front contact sensor is not in contact with the wall and the mode changes to search mode M7. As shown in FIG. 33 at (b), the vehicle turns toward the wall in search mode M7. Next, as shown in FIG. 33 at (c), while the vehicle is moving under search mode M7, it is detected that the front contact sensor has come into contact with the wall and the mode changes to second contact contour mode M12. As shown in FIG. 33 at (d), the mode then changes to first contact contour mode M11 via second contact contour mode M12 and contour travel control is carried out. Then, as shown in FIG. 33 at (e), where the front contact sensor has detected the disappearance of the wall while the vehicle is moving under contour travel control, the mode changes to straight ahead mode M8. Then, as shown in FIG. 33 at (f), the outputs of the front and rear contact sensors immediately before the detection of the disappearance of the wall are compared, and where they are approximately the same, the mode changes to first straight ahead mode M14 under which straight ahead control is executed. Then as shown in FIG. 33 at (g), where it is detected that the front contact sensor has come into contact with the wall while the vehicle is moving under straight ahead control, the mode changes to third contact contour mode M13. Finally, as shown in FIG. 33 at (h), the mode changes to first contact contour mode M11 via third contact contour mode M13 and contour travel control is executed.

(8) Combined use of contact contour travel control and non-contact contour travel control In the explanation provided above, when the disappearance of the wall is detected in contour travel control using contact sensors, the mode is changed to straight ahead mode. However, depending on the orientation of the automatic vehicle when the mode is changed to straight ahead mode, the automatic vehicle may deviate from the proper straight ahead path if it is allowed to move for too long. As a result, in contour travel control using contact sensors, non-contact contour travel control is carried out using non-contact sensors after the disappearance of the wall is detected. Therefore, when it is detected that the wall is once again present, contour travel control using the wall can be resumed, reducing the chance of errors in straight ahead control.

Figure 34:
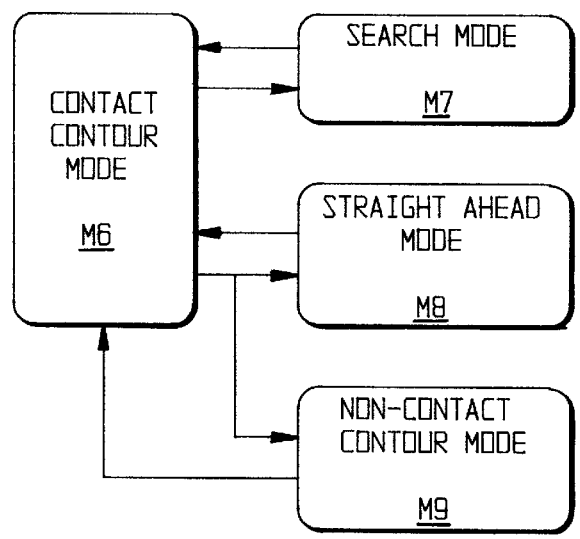
FIG. 34 is a drawing showing the changes in operation mode where both contact and non-contact contour travel controls are used.

Changes in the operation mode in order to perform the operation described above will now be explained. FIG. 34 shows changes in the operation mode in which both contact and non-contact contour travel controls are used. With reference to FIG. 34, in non-contact contour mode M9, contour travel control is carried out using non-contact sensors. When the front contact sensor has suddenly lost contact with the wall while the vehicle is in contact contour mode M6, the non-contact sensors obtain to measure the distances to the walls on either side, and where said distances are measurable, the mode changes to non-contact contour mode M9. When it is detected that the front contact sensor has come into contact with the wall while the vehicle is in non-contact contour mode M9, the mode changes to contact contour mode M6. By switching from one mode to another as described above, contact contour travel control and non-contact contour travel control can be used together. In other words, where contact sensors can be used, contact contour travel control may be performed using contact sensors, and where contact sensors cannot be used, non-contact contour travel control may be executed using non-contact sensors, making accurate contour travel control possible at all times.

An example of operation in accordance with the mode changes described above will now be explained. FIG. 35 is a drawing to explain the example of operation according to mode changes shown in FIG. 34. First, as shown in FIG. 35 at (a), contour travel control is carried out using contact sensors in contact contour mode M6. Then, as shown in FIG. 35 at (b), the front contact sensor detects the disappearance of the wall W1 while the automatic vehicle is moving. Next, as shown in FIG. 35 at (c), the distances to walls W1 and W2 are measured by the right and left non-contact sensors. Here, since both distances can be measured, the mode changes to non-contact contour mode M9. Then, as shown in FIG. 35 at (d), contour travel control using non-contact sensors is executed. Next, as shown in FIG. 35 at (e), when it is detected that the front contact sensor has come into contact with wall W1 while the vehicle is moving under non-contact contour travel control, the mode changes to contact contour mode M6. Finally, as shown in FIG. 35 at (f), contour travel control is carried out in contact contour mode M6.

(9) Control of the working arm

The control method for working arm 2 will now be explained. In controlling working arm 2, when contour travel control is carried out using contact sensors, working arm 2 is moved away from the wall such that the touch sensors attached to working main unit 1 can come sufficiently close to the wall to measure the distance to the wall. While the vehicle is moving under contour travel control, the position of working arm 2 is adjusted based on the distance information obtained from the front and rear contact sensors. Therefore, even where the automatic vehicle is not parallel to the wall, working arm 2 may be made to come into close contact with the wall, and since the unevenness of the wall can be detected in advance, working arm 2 is prevented from getting stuck on a protrusion on the wall.

Figure 36:
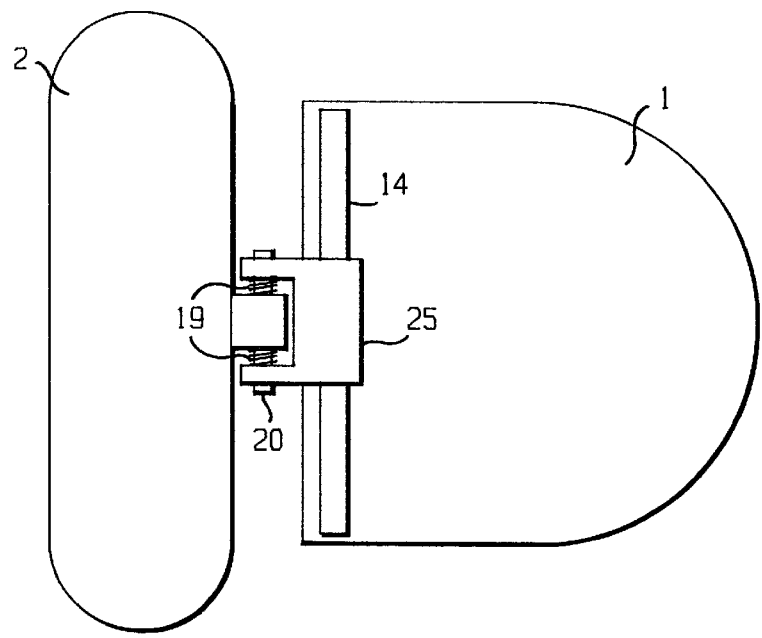
FIG. 36 shows the construction of the attachment of the working arm.

A specific example of working arm 2 in connection with which the control method described above is performed will now be explained. FIG. 36 is a plan view showing the construction of working arm 2. With reference to FIG. 36, the automatic vehicle further includes arm attachment member 25, arm fixing springs 19 and arm slide shaft 20. Arm attachment member 25 is slidably supported by slide mechanism 14. Working arm 2 is slidably held by arm slide shaft 20 mounted to arm attachment member 25. The position of working arm 2 is determined by means of arm fixing springs 19 that sandwich working arm 2, said springs being located around arm slide shaft 20. Using the construction described above, working arm 2 is attached to working main unit 1 such that it can slide to a certain extent when lateral force is applied.

A first control example pertaining to the working arm constructed as described above will now be explained. In this example, two contact sensors, one located in front of the other, are attached on one side of the vehicle and the position of working arm 2 is calculated using these two contact sensors. Working arm 2 is attached to working main unit 1 via springs such that it can slide laterally to a certain extent.

Figure 37:
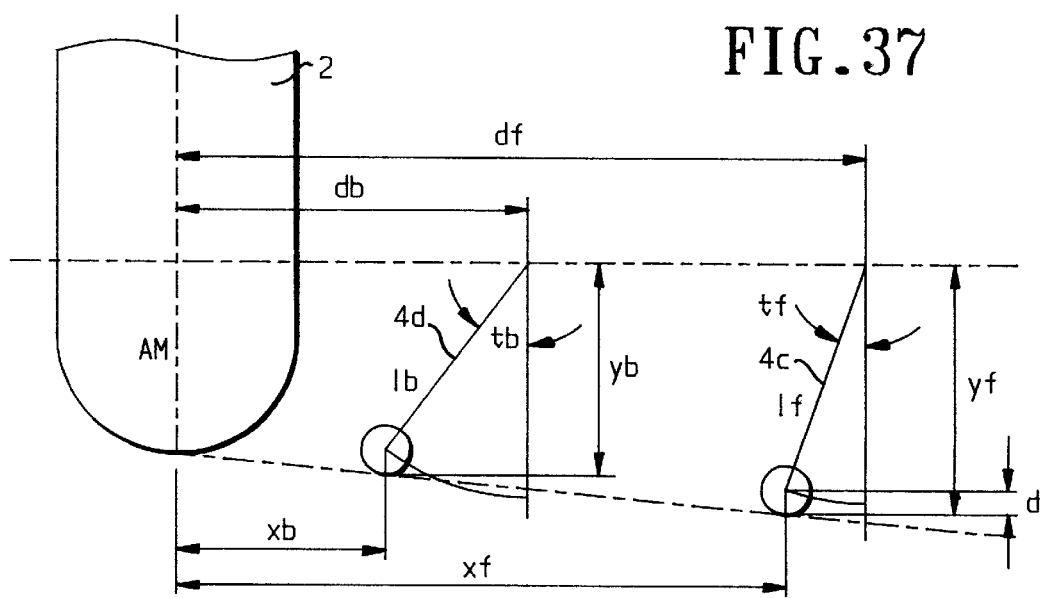
FIG. 37 shows the positional relationship between the working arm and four contact sensors.

The positional relationship between working arm 2 and the front and rear contact sensors will first be explained. FIG. 37 is a drawing showing the positional relationship between the working arm and the contact sensors. With reference to FIG. 37, if the distances between working arm 2 and the central positions of the shafts of potentiometers of front and rear contact sensors 4c and 4d are df and db, respectively, tip positions of front and rear distance sensors 4c and 4d (xf, yf) and (xb, yb) can be calculated in an approximate fashion using the following equations based on sensor angles tf and tb where the difference between tf and tb is very small.

$$xf = df - l \times \sin(tf) \quad (8)$$

$$yf = -lf \times \cos(tf) - d \quad (9)$$

$$xb = db - lb \times \sin(tb) \quad (10)$$

$$yb = -lb \times \cos(tb) - d \quad (11)$$

The position of working arm 2 is obtained using the following equation, such that the tip of working arm 2 will be located on a line that passes tip positions of front and rear contact sensors 4c and 4d (xf, yf) and (xb, yb).

$$AM = (yf \times xb - yb \times xf)/(xb - xf) \quad (12)$$

Where the vehicle moves beside a flat wall under contour travel control, by moving working arm 2 such that its tip comes to the position obtained through equation (12), working arm 2 can perform work while being in contact with the wall at all times even where the automatic vehicle is not parallel to the wall while moving, or where the vehicle is not located away from the wall by a certain distance. Where there is a small protrusion on the wall, the contact sensors ride over it, but working arm 2 advances to and then collides with the small protrusion. In order to eliminate this inconvenience, in this embodiment, arm position AM to which the arm will be moved is calculated based on the data regarding the positions of the tips of distance sensors 4d detected period of time t8 ago. Period of time t8 is the time required for the automatic vehicle to move the distance between rear contact sensor 4d and the arm position. In order to implement this delay, FIFO (first in first out) memory 53 (shown in FIG. 44) is used in this embodiment. The result of the arm position calculation based on the sensor output is saved to FIFO memory 53 at a prescribed point in time, and simultaneously, the arm position calculated at the end of previous prescribed interval t8 is read from FIFO memory 53 and the tip of working arm 2 is moved to the arm position thus read.

Figure 38:
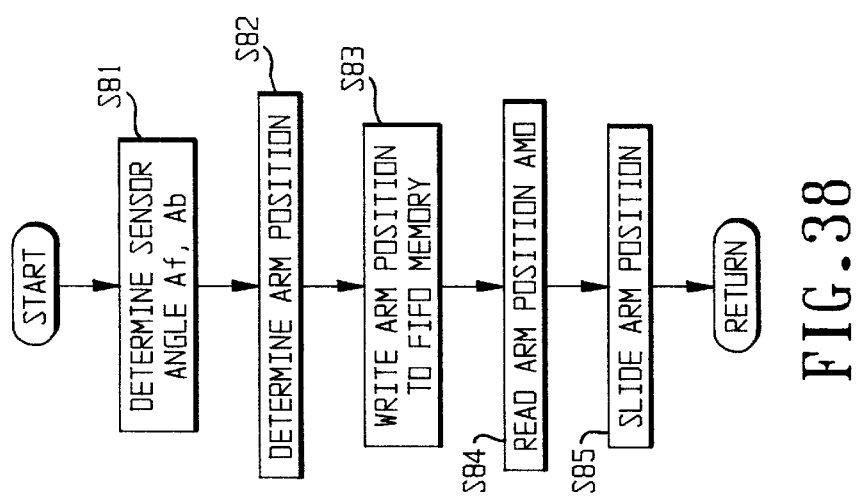
FIG. 38 is a flow chart to explain a first method to control the working arm.

The control method described above for the working arm will now be specifically explained. FIG. 38 is a flow chart to explain said first control method for the working arm. This working arm control is carried out at prescribed intervals t6.

First, in step S81, angles Af and Ab for the front and rear contact sensors are obtained. Next, in step S82, arm position AM is calculated based on thus obtained front and rear contact sensor angles Af and Ab using equations (8) through (12). Then, in step S83, arm position AM is saved in FIFO memory 53. Next, in step S84, arm position AM0 calculated at the end of previous prescribed interval t8 is read from FIFO memory 53. Finally, in step S85, working arm 2 is moved such that its tip may be positioned at arm position AM0.

An example of operation of the working arm using the first control method described above will now be explained. FIG. 39 is a drawing to explain the example of operation of the working arm using the control method shown in FIG. 38. First, as shown in FIG. 39(a), while the automatic vehicle is moving beside a flat wall, the tip of working arm 2 is in a line extending from the tips of front and rear contact sensors 4a and 4b and is also in contact with the wall. Then, as shown in FIG. 39(b), front contact sensor 4a comes into contact with a protrusion on the wall. When this happens, the arm position is calculated such that the tip of working arm 2 is substantially aligned with the straight line that passes through the tips of front and rear contact sensors 4a and 4b. Next, as shown in FIG. 39(c), front contact sensor 4a passes over the protrusion on the wall. Then, although working arm 2 moves to the arm position calculated as shown in connection with FIG. 39(b) above, working arm 2 stays in contact with the wall while remaining at a position away from its desired position, in resistance to the force of the internal spring.

Then as shown in FIG. 39(d), rear contact sensor 4b comes into contact with the protrusion on the wall. When this happens, the arm position is calculated such that the tip of working arm 2 may become substantially aligned with the straight line that passes through the tips of front and rear contact sensors 4a and 4b. Then, as shown in FIG. 39(e), rear contact sensor 4b passes over the protrusion on the wall. However, since working arm 2 is moved to the arm position calculated in connection with FIG. 39(d) immediately before coming into contact with the wall, the working arm does not come into contact with the protrusion on the wall. Finally, as shown in FIG. 39(f), working arm 2 overcomes the protrusion on the wall and is moved to a position where the tip of working arm 2 is in contact with the wall again.

A second control method for the working arm will now be explained. In the first control method for the working arm, because the tilt of the automatic vehicle relative to the protrusion on the wall and the wall is not determined, where there is a protrusion on the wall, contour travel control and calculation of the arm position may be performed inaccurately. Therefore, in the second control method, contact sensors are attached to three positions on either side of working main unit 1, i.e., front, middle and rear, such that the tilt of working main unit 1 and the unevenness of the wall are detected independently of each other, and the position of the working arm is controlled based on these detection results.

Figure 41:
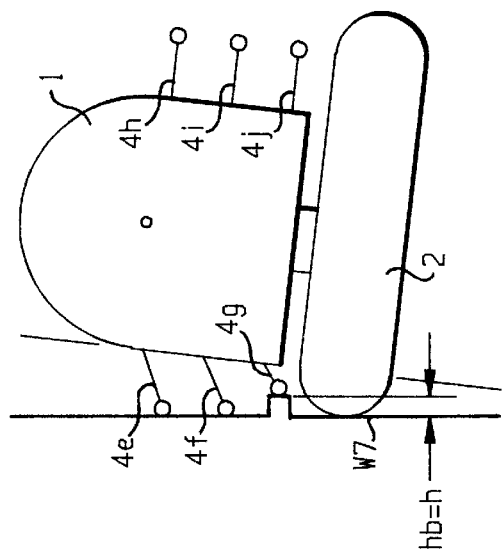
FIG. 41 is a second drawing showing the positional relationship between the working arm and six contact sensors.
Figure 40:
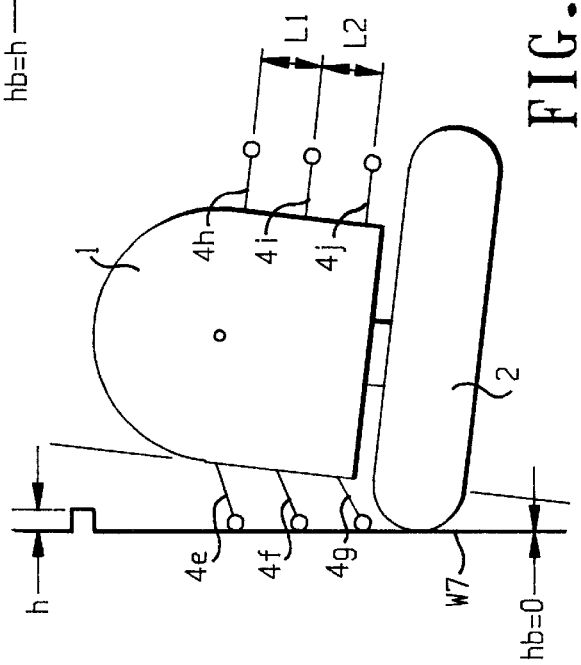
FIG. 40 is a first drawing showing the positional relationship between the working arm and six contact sensors.

First, the positional relationship between the working arm and the six contact sensors will be explained. FIGS. 40 and 41 are first and second drawings showing the positional relationship between the working arm and the six contact sensors. With reference to FIGS. 40 and 41, where the automatic vehicle moves beside left wall W7 under contour travel control, front, middle and rear contact sensors 4e through 4g on the left side are used, and where the vehicle moves beside right wall under contour travel control, the three sensors 4h through 4j on the right side are used. Where the vehicle is moving beside a flat wall as shown in FIG. 40, the tips of the three contact sensors 4e through 4g are aligned in one straight line. When rear contact sensor 4g passes over a protrusion on the wall as shown in FIG. 41, the tips of the three contact sensors 4e through 4g are no longer aligned in a straight line. In such a case, the position of the automatic vehicle relative to wall W7 and the vehicle's tilt relative to wall W7 are calculated using front and middle contact sensors 4e and 4f.

A case in which working arm 2 is moved to a position obtained by subtracting protrusion height h from arm position AM calculated from the outputs of the three contact sensors 4e through 4g will now be explained in detail. First, arm position AM is calculated based on the sensor outputs using the following method. For sensors whose outputs are to be used in the calculation of the arm position, two contact sensors that are not in contact with the protrusion (or that are in contact with the wall) are selected, and calculation is made using equation (12) so that the tip of the working arm may be aligned with the straight line that passes through the tips of the selected sensors.

It is determined whether or not a contact sensor is in contact with the protrusion by calculating the position of the tip of that contact sensor. Where none of the contact sensors is in contact with the protrusion, the tips of the three contact sensors are aligned in a straight line. When one contact sensor comes into contact with the protrusion, the tips of the three contact sensors are not aligned in one straight line.

Therefore, when the tips of the contact sensors are not aligned in a straight line, it is necessary to determine which contact sensor is in contact with the protrusion. In this embodiment, this determination is made using the fact that the tilt of the automatic vehicle relative to the wall does not change much in a sufficiently short period of time. In other words, two of the three contact sensors are grouped together, and degrees of tilt Kfc, Kcb and Kfb of the automatic vehicle relative to the direction of movement are obtained from each of the groups of contact sensors. The pair of sensors having a value closest to previously obtained degree of tilt K0 is determined to be sensors not in contact with the protrusion.

Height h of the protrusion is obtained using the following method. Height h of the protrusion is detected by rear contact sensor 4g. The difference between a straight line connecting the tips of the two contact sensors selected in the above step and the tip of rear contact sensor 4c is deemed height hb of the protrusion that is located at the position of the rear contact sensor. In FIG. 40, hb=0, while in FIG. 41, hb=h. Since the position of the rear contact sensor and the position of the tip of the working arm are different, data is obtained for the period of time t9, said period of time t9 being the time required for the automatic vehicle to move the distance between rear contact sensor 4g and the arm position. In order to realize this delay, FIFO memory 53 is used as in the first control method. Specifically, height hb of the protrusion which is at the position of the rear contact sensor is saved in FIFO memory 53 at a certain point in time, and at the same time protrusion height h calculated at the end of previous prescribed interval t9 is read from FIFO memory 53.

Figure 42:
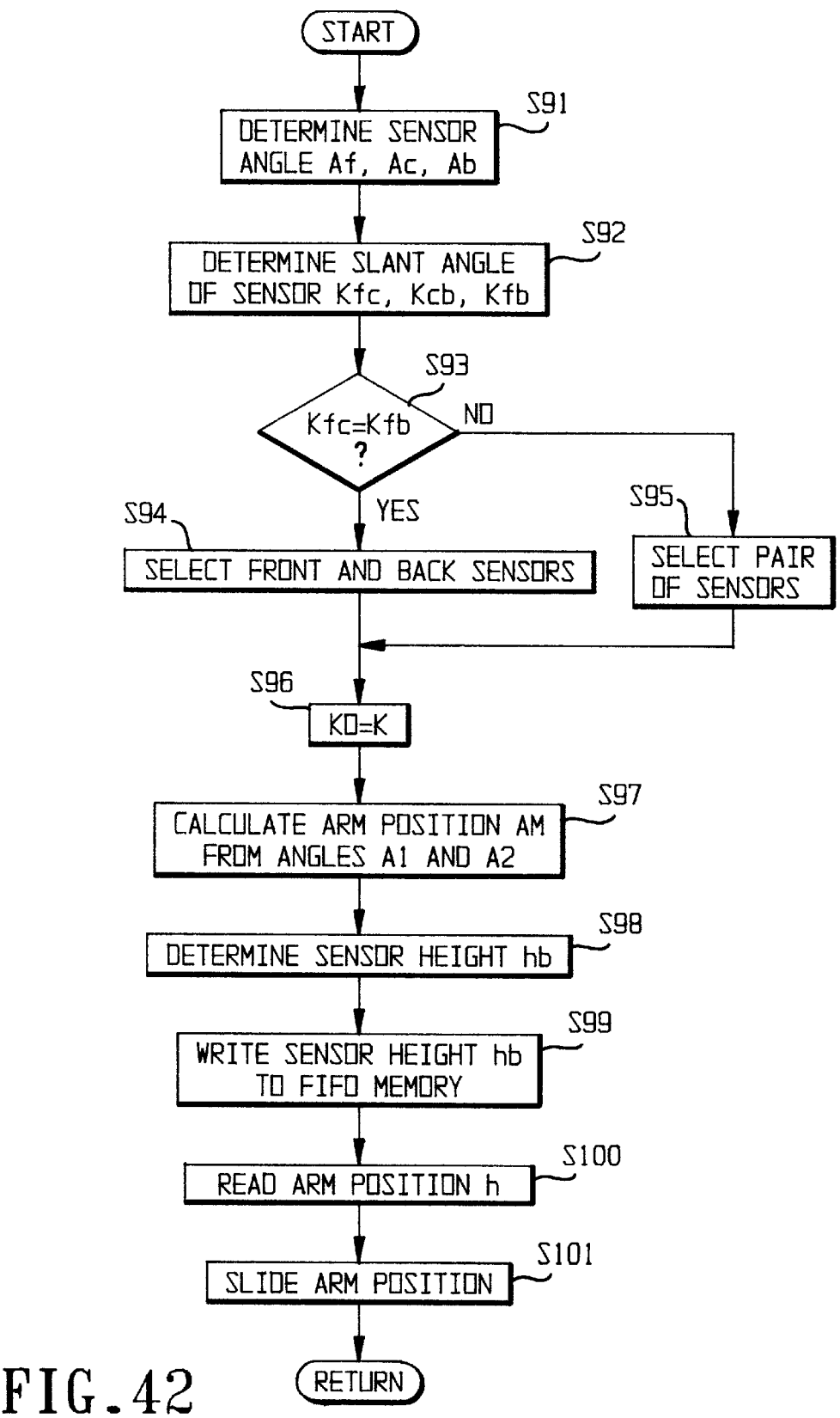
FIG. 42 is a flow chart to explain a second method to control the working arm.
Figure 43A:
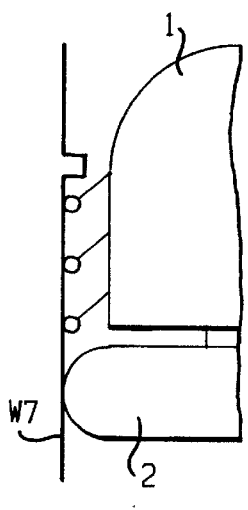
FIG. 43 is a drawing to explain an example of the operation of the working arum under the control shown in FIG. 42.
Figure 43B:
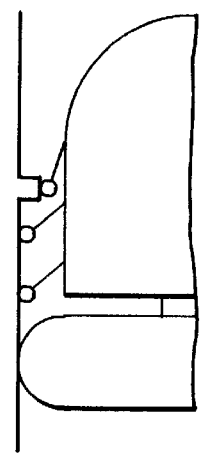
Figure 43C:
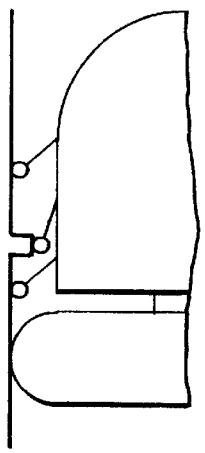
Figure 43D:
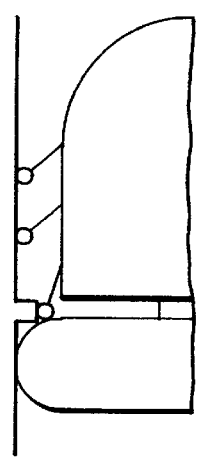
Figure 43E:
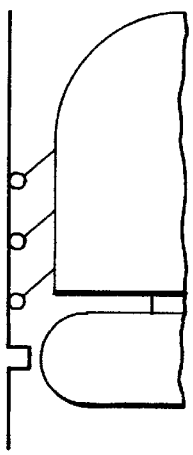
Figure 43F:
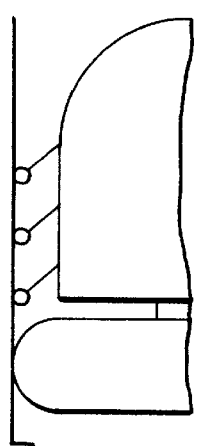

The second control method above pertaining to the working arm will now be more specifically explained. FIG. 42 is a flow chart to explain the second control method pertaining to the working arm. In the second control method, the following sequence is carried out at prescribed intervals t7.

First, in step S91, angles Af, Ac and Ab of front, middle and rear contact sensors, respectively, are obtained. Next, in step S92, degrees of tilt Kfc, Kcb and Kfb of the straight lines connecting the tips of the two contact sensors of respective sensor pairs are obtained. Then, in step S93, it is determined whether Kfc=Kfb (=Kcb). Where Kfc=Kfb, the front and rear contact sensors are selected in step S94. Otherwise, the pair of sensors having a value (Kfc, Kcb or Kfb) closest to K0 is selected in step S95. Then, in step S96, degree of tilt K relative to the direction of movement selected in the sequence described above is saved as degree of tilt K0.

Next, in step S97, arm position AM is calculated from angles A1 and A2 of the selected contact sensors. Then, in step S98, height hb of the rear contact sensor is calculated. Next, in step S99, height hb of the rear contact sensor thus calculated is saved in FIFO memory 53. Then, in step S100, height h of the rear contact sensor calculated at the end of previous prescribed interval t9 is read from FIFO memory 53. Finally, in step S101, working arm 2 is moved such that its tip comes to a position obtained by subtracting height h obtained at the end of previous prescribed interval t9 from arm position AM.

An example of operation of the working arm using the second control method described above will now be explained. FIG. 43 is a drawing to explain the example of operation of the working arm using the control shown in FIG. 42. First, as shown in FIG. 43(*a*), while the automatic vehicle is moving beside a flat wall under contour travel control, the arm position is calculated such that the tip of working arm 2 is aligned with a straight line passing through the tips of the front, middle and rear contact sensors. Next, as shown in FIG. 43(*b*), front contact sensor 4a comes into contact with a protrusion on the wall. When this happens, the arm position is calculated such that the tip of working arm 2 is aligned with the straight line passing through the tips of middle and rear contact sensors 4b and 4c. Then, as shown in FIG. 43(*c*), front contact sensor 4a passes over the protrusion on the wall and middle contact sensor 4b comes into contact with said protrusion. When this happens, the arm position is calculated such that the tip of working arm 2 may be aligned with the straight line passing through the tips of front and rear contact sensors 4a and 4c.

Next, as shown in FIG. 43(*d*), middle contact sensor 4b passes over the protrusion on the wall and rear contact sensor 4c comes into contact with said protrusion. When this happens, the arm position is calculated such that the tip of working arm 2 may be aligned with the straight line passing through the tips of front and middle contact sensors 4a and 4b. The height of the protrusion is also saved here. Then, as shown in FIG. 43(e), rear contact sensor 4c passes over the protrusion on the wall. When this happens, the arm position is calculated such that the tip of working arm 2 will be aligned with the straight line passing through the tips of front and rear contact sensors 4a and 4c, but since the position of working arm 2 shifts by as much as the height of the protrusion saved in the situation shown in FIG. 43(e), working arm 2 does not come into contact with the protrusion on the wall. Finally, as shown in FIG. 43(f), working arm 2 passes over the protrusion. When this happens, the tip of working arm 2 is aligned with the line extending from the tips of front, middle and rear contact sensors 4a through 4c and is also in contact with the wall.

While contact sensors are used in the control of the working arm described above, the same effect may be obtained using non-contact sensors by using a construction similar to that described above.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle which travels along a path, comprising:
   a contact sensor which detects a distance to an object by contacting the object; and
   a traveling unit which moves the vehicle along the path based on the detected distance and makes the vehicle execute a predetermined movement when distance detection by the contact sensor is impossible, wherein said traveling unit moves the vehicle in a wireless fashion.

2. A vehicle which travels along a path, comprising:
   a contact sensor which detects a distance to an object by contacting the object; and
   a traveling unit which moves the vehicle along the path based on the detected distance and moves the vehicle straight when the distance detection by the contact sensor is impossible.

3. A vehicle which travels along a path, comprising:
   a contact sensor which detects a distance to an object by contacting the object;
   a traveling unit which moves the vehicle along the path based on the detected distance and makes the vehicle execute a predetermined movement when the distance detection by the contact sensor is impossible;
   a non-contact sensor which detects a distance to the object without contacting the object; and
   wherein the traveling unit moves the vehicle along the path based on the distance detected by the noncontact sensor when the distance detection by the contact sensor is impossible.

4. A vehicle which travels along a path, comprising:
   a main body including a traveling unit for advancing said main body along the path;
   a working unit which is movably connected with said main body;
   a sensor which detects a distance to an object, the detected distance relating to a distance between the object and a location on the vehicle that is in front of said working unit with respect to the path; and
   a controller which controls said working unit to move the working unit relative to said main body based on the detected distance while said traveling unit advances said main body along the path.

5. The vehicle as claimed in claim 4, wherein the working unit is moved along the object based on the detected distance to the object.

6. The vehicle as claimed in claim 4, wherein the sensor is a contact sensor which contacts with the object for detecting the distance to the object.

7. The vehicle as claimed in claim 6, wherein the contact sensor comprises at least two contact sensor elements located at a side surface of the main body.

8. The vehicle as claimed in claim 4, wherein the working unit is moved in order that a side end of the working unit substantially contacts with the object.

9. A vehicle which travels along a path, comprising:
   a main body;
   a sensor which detects a distance to an object; and
   a working unit which is movably connected with the main body, the working unit being moved based on the detected distance to the object;
   wherein the working unit is moved based on the distance to the object detected before a predetermined time.

10. A vehicle which travels along a path, comprising:
    a main body including a traveling unit for advancing said main body along the path;
    a working unit which is movably connected with said main body;
    a sensor which detects a protrusion of an object, the detected protrusion relating to a protrusion at a position in front of said working unit with respect to the path; and
    a controller which controls said traveling unit and said working unit to move said working unit relative to said main body based on the detected protrusion and to advance said main body along the path.

11. A vehicle which travels along a path, comprising:
    a sensor which detects a distance to an object existing at a side of the vehicle with respect to the path; and
    a traveling unit which moves the vehicle based on the detected distance and stops moving the vehicle based on the detected distance when the detected distance changes more than a predetermined value.

12. The vehicle as claimed in claim 11, wherein the traveling unit moves the vehicle straight when the detected distance changes with more than a predetermined value.

13. The vehicle as claimed in claim 11, wherein the traveling unit resumes moving the vehicle based on the detected distance when the detected distance changes less than a predetermined value range.

14. A vehicle which travels along a path, comprising:
    a contact sensor which detects an object by contacting the object and thus detects a distance to the object, said contact sensor being able to detect an object within a predetermined distance; and
    a traveling unit which moves the vehicle based on the detected distance in order that the object always exists within the predetermined distance from the contact sensor.

15. A vehicle which travels along a path, comprising:
    a contact sensor which detects a distance to an object by contacting the object;
    a non-contact sensor which detects a distance to the object without contacting the object; and a traveling unit which moves the vehicle based on at least one of the distance detected by the contact or non-contact sensors.

16. A vehicle which travels along a path, comprising:

a main body;

a sensor which detects a distance to an object and outputs a plurality of data relating to the distance periodically;

a working unit which is movably connected with the main body; and a controller which inputs the plurality of the data periodically outputted from said sensor, and controls said working unit to move relative to the main body based on the plurality of the data while the vehicle advances along the path.

17. The vehicle as claimed in claim 16, wherein said sensor includes a plurality of sensor elements.

* * * * *